US012603861B2

(12) United States Patent
Kornegay et al.

(10) Patent No.: US 12,603,861 B2
(45) Date of Patent: Apr. 14, 2026

(54) DEFENSE-IN-DEPTH METHOD BASED ON KNOWN DEVICE BEHAVIOR

(71) Applicant: Morgan State University, Baltimore, MD (US)

(72) Inventors: Kevin Kornegay, Middle River, MD (US); Khir Henderson, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 18 days.

(21) Appl. No.: 18/646,655

(22) Filed: Apr. 25, 2024

(65) Prior Publication Data

US 2024/0430229 A1     Dec. 26, 2024

Related U.S. Application Data

(60) Provisional application No. 63/461,641, filed on Apr. 25, 2023.

(51) Int. Cl.
H04L 9/40          (2022.01)

(52) U.S. Cl.
CPC ........ H04L 63/0236 (2013.01); H04L 63/102 (2013.01); H04L 63/20 (2013.01); *H04L 63/0876* (2013.01)

(58) Field of Classification Search
CPC ... H04L 63/0236; H04L 63/102; H04L 63/20; H04L 63/0876
See application file for complete search history.

(56) References Cited

U.S. PATENT DOCUMENTS 8,204,984 B1 *   6/2012   Aziz ................... H04L 63/0227
                                                        709/224
11,539,716 B2   12/2022   Meng et al.
                          (Continued)

OTHER PUBLICATIONS

P. Baral, N. Yang, and N. Weng, "IoT Device Identification Using Device Fingerprint and Deep Learning," IntechOpen, pp. 2-23, 2023.

(Continued)

*Primary Examiner* — Khoi V Le
(74) *Attorney, Agent, or Firm* — Whiteford, Taylor & Preston, LLP; Peter J. Davis

(57)          ABSTRACT

Methods and systems identify a device on an IoT network. A network controller detects connection of the device on the IoT network and determines an organizational unique identifier (OUI) from a media access control (MAC) address of the device. The network controller retrieves a vendor ID from an OUI database. The network controller sends requests to the device via transmission control protocol (TCP) ports and receives a TCP port output. The network controller sends user datagram protocol (UDP) datagrams to the device via UDP ports and receives a UDP port output. The network controller determines a device fingerprint from the vendor ID, the TCP port output, and the UDP port output and matches the device fingerprint to parameters in an identity database to determine a first identity of the device. The network controller sends a DHCP deauthorization request to the device. After detecting reconnection of the device on the IoT network, the network controller collects DHCP option 55 parameters from the device and refines the first identity to determine a second identity based on the parameters.

23 Claims, 14 Drawing Sheets

(56) References Cited

U.S. PATENT DOCUMENTS

| | | | | |
|---|---|---|---|---|
| 2002/0184533 A1* | 12/2002 | Fox | .................... | H04L 63/1433 |
| | | | | 709/224 |
| 2015/0143504 A1* | 5/2015 | Desai | ................. | H04L 63/0245 |
| | | | | 709/224 |
| 2017/0302665 A1 | 10/2017 | Zou et al. | | |
| 2018/0145986 A1* | 5/2018 | Chien | ................... | H04L 63/101 |
| 2018/0262533 A1 | 9/2018 | McCaig et al. | | |
| 2022/0303167 A1 | 9/2022 | Wang et al. | | |

OTHER PUBLICATIONS

B. Bezawada, M. Bachani, J. Peterson, H. Shirazi, and I. Ray "Behavior Fingerprinting of IoT Devices," Colorado State University, pp. 41-50, Oct. 2018.

C. Koball, B. Rimal, Y. Want, T. Salmen, and C. Ford "IoT Device Identification Using Unsupervised Machine Learning," MDPI, pp. 1-11, 2023.

K. Kostas, M. Just, and M. Lones, "A behavior-based device identification method for the IoT," IEE Internet of Things Journal, pp. 1-10, 2022.

Y. Liu, J. Wang, J. Li, S. Niu, and H. Song, "Machine Learning for the Detection and Identification of IoT Devices," IEE Internet of Things Journal, pp. 1-23, 2020.

A. Sivanathan, H. H. Gharakheili, F. Loi, A. Radford, C. Wijenayake, A. Vish-wanath, and V. Sivaraman, "Classifying IoT Devices in Smart Environments Using Network Traffic Characteristics," IEEE Transactions on Mobile Computing, vol. 18, No. 8, pp. 1745-1759, 2019.

A. Sivanathan, H. H. Gharakheili, and V. Sivaraman, "Inferring IoT Device Types from Network Behavior Using Unsupervised Clustering," Proceedings—Conference on Local Computer Networks, LCN, vol. 2019—Octob, pp. 230-233, 2019.

A. Sivanathan, H. H. Gharakheili, and V. Sivaraman, "Can We Classify an IoT Device using TCP Port Scan?" 018 IEEE 9th International Conference on Information and Automation for Sustainability, ICIAfS 018, 2018.

D. Dodson, D. Montgomery, T. Polk, M. Ranganathan, M. Souppaya, S. Johnson, A. Kadam, C. Pratt, D. Thakore, M. Walker, E. Lear, B. Weis, W. C. Barker, D. Coclin, A. Hojjati, C. Wilson, T. Jones, A. Baykal, D. Cohen, K. Yeich, Y. Fashina, P. Grayeli, J. Harrington, J. Klosterman, B. Mulugeta, S. Symington, and J. Singh, "Securing Small-Business and Home Internet of Things (IOT) Devices: Mitigating Network-Based Attacks Using Manufacturer Usage Description (MUD)," NIST, May 2021.

Cisco, "Cisco Identity Services Engine—Cisco," 2022, Accessed on: Mar. 16, 2022. [Online]. Available: https://www.cisco.com/c/en/us/products/security/ identity-services-engine/index.html.

Cisco, "What is MUD?—Manufacturer Usage Description—Document—Cisco DevNet," 2022, Accessed on: Mar. 13, 2022. [Online]. Available: https://developer.cisco.com/docs/mud/#!what-is-mud.

Cisco, "FAQ—Manufacturer Usage Description—Document—Cisco DevNet," 2019, Accessed on: Mar. 16, 2022. [Online]. Available: https: //developer.cisco.com/docs/mud/#!faq/frequently-asked-questions-faq.

* cited by examiner

100

IoT Device
104

MUD URL
106

MUD Process
102

Access
Policy 114

MUD File
Query
108

MUD File
110

MUD File Server
112

400

404

Device Parameters 406

Device Fingerprint 408

Identity Database 412

Identification Process 402

Identity 414

Match 410

Identified Device 416

Data File Population          Fingerprints Data File

1200

1300

DEFENSE-IN-DEPTH METHOD BASED ON KNOWN DEVICE BEHAVIOR

CROSS-REFERENCE TO RELATED APPLICATIONS

This application is based upon and claims the benefit of U.S. Provisional Application No. 63/461,641 titled "Defense-in-Depth Method Based on Known Device Behavior," filed with the United States Patent & Trademark Office (USPTO) on Apr. 25, 2023, the specification of which is incorporated herein by reference in its entirety.

This application also incorporates by reference in its entirety related U.S. Non-Provisional application Ser. No. 18/600,391 titled "Ensemble Intrusion Detection System for IoT Platforms," filed with the USPTO on Mar. 8, 2024.

FEDERALLY SPONSORED RESEARCH AND DEVELOPMENT

This subject matter of this application was developed using U.S. Government funds under contract of the National Science Foundation (NSF), Grant No. 2042700.

FIELD OF THE INVENTION

The invention relates to security for an Internet of Things (IoT) cloud platform and edge devices. More specifically, the invention relates to systems and methods for identifying an unknown or non-compliant device connected to an IoT network by generating a unique fingerprint of the device, pairing the identified device with a behavior profile based on its identity, and layering appropriate security methods for intrusion detection and prevention, dynamic access control, and device authentication and attestation tailored to the identity, behavior profile, and IoT environment.

RELATED ART

U.S. Patent Application Publication No. 2018/0262533 describes a system that monitors device data as applied to a communications network. U.S. Patent Application Pub. No. 2017/0302665 tends to use media access control (MAC) addresses to but also relies on device fingerprinting to identify a device. U.S. Pat. No. 11,539,716 leverages device fingerprinting backed by deep learning models. U.S. Patent Application Pub. No. 2022/0303167 describes a method, apparatus, and system for identifying and qualifying devices.

BACKGROUND

As Internet of Things (IoT) devices become more commonplace in everyday life, with everyday appliances such as lightbulbs, refrigerators, security cameras, doorbells, wearables such as watches, medical devices, farming tools, and other everyday objects globally connected on the Internet for improved functionality, control, and utility, security concerns are at the forefront. However, the Internet and many of its succeeding peripherals, primarily developed to share services and resources over a generally insecure communication channel, were designed with security as an afterthought. The proliferation of over 10 billion connected IoT devices in a wide variety and scale of IoT networks threatens the nation's critical infrastructure because existing security methods ineffectively focus on problems that only affect or are proprietary to a small portion of these IoT devices.

The current network security landscape provides minimal oversight towards access control and is inadequate due to unaccounted human behavior, such as in the design flow for managing the security of personal networks. As a result, these inherently insecure networks exponentially increase our nation's critical infrastructure's attack surface. While access control and network visibility/device identification methods are at the forefront of concern, meaningful implementations have been difficult to deploy at scale.

One solution in the art is an Internet Engineering Task Force (IETF) standard defining a Manufacturer Usage Description (MUD) 100, depicted in FIG. 1, which automates access control at the "edge" of the IoT devices' network. MUD 100 is one example of a specification-based security protocol and standard. It is noted that, in terms of security and privacy, IoT security specifications such as MUD 100 are few. The proliferation of IoT and its widespread use have outpaced the ability to support certain IoT security specifications, and existing IoT security specifications may present issues such as low adoption rates, a bias towards a certain enterprise, a lack of access controls, and a lack of development and evolution as IoT needs grow and change.

MUD 100 provides onsite and active security by applying active security methods at the network edge. MUD 100 places access control at the device level by having each device declare its personal identity and, subsequently, the rules for who and what can talk to it. MUD 100 uses the device manufacturer as the authority to identify IoT devices and specify the intended network behavior of said devices. The network can subsequently use this intent to author a context-specific access policy that permits the device to function within only those parameters. In this manner, MUD becomes the authoritative identifier and enforcer of policy for devices on the network.

Referring to FIG. 1, the MUD process 102, defined in RFC 8520, which is herein incorporated by reference in its entirety, begins with onboarding an IoT device 104, such as an IoT lightbulb. When the IoT device 104 is onboarded onto a network, it is encoded with a MUD Universal Resource Locator (URL) 106 containing a "usage descriptor" designated by its manufacturer. The usage descriptor identifies the IoT device 104's intended network behavior. The MUD URL 106 is queried 108 when the IoT device 104 connects to the IoT network, and a MUD descriptor file 110 is then downloaded securely from a MUD file server 112. The IoT device 104's behavior is then translated into network access control rules that enforce a behavior or access policy 114 by allowing or denying the IoT device 104's intended traffic.

MUD works by embedding and emitting a uniform resource identifier (URI) via a Link Layer Discovery Protocol (LLDP), Dynamic Host Configuration Protocol (DHCP), or X.509 (defining the format of public key certificates) request. These protocols serve as a vendor-neutral link-layer protocol used to advertise the identity of an IoT device on a network. The attached MUD URI reveals the intended usage of each IoT device to the IoT network, and the IoT device's network controller can disallow specific network access based on IP and port egress and ingress. This encoded device-specific URI is collected by a MUD controller that functions as the network administrator. The network administrator requests the MUD file from a secure server. The URL points to a MUD policy that describes the IoT device's communication behavior via access flow rules. This file contains the abstracted policy that describes the communication protocol the IoT device needs to function.

The access policy is then established based on the rules of the MUD profile. Finally, the MUD controller establishes the appropriate access controls in the network for the IoT device.

MUD's strengths are that it provides automation and scalability, offers security for IoT as a standard, modernizes network access control lists (NACLs), provides a distributed root of trust, and provides onsite and proactive security. As an industry standard, MUD is simple to implement and is interoperable and extendable for the various settings of IoT networks. MUD thus can be used by various and diverse types of devices, manufacturers, and IoT. MUD is also supported by public and private institutions and has open-source, public, and proprietary solutions. MUD, which applies to various software and hardware, automates a security policy without requiring user intervention, thus reducing user error. With MUD, security is built in, so the user need not be aware of its security requirements. These strengths make it a good basis for a framework for a sustainable and secure network security architecture for IoT.

However, while MUD is designed to be interoperable and extendable, it can operate on any hardware and software as long as an implementation follows its open standard. MUD is largely premature for fulfilling the comprehensive needs of all IoT networks, especially the home/consumer space, which is the dominant space for IoT networks. MUD is traditionally implemented in an industry, or enterprise, setting, in which there is access to networking knowledge and proprietary hardware. MUD has been limited to preconfigured, compliant IoT devices in such settings. Because home/consumer IoT networks include legacy or non-compliant devices that do not implement the MUD standard by default, implementations in the home/consumer space using open-source hardware, software, consumer routers, and cloud infrastructure are underdeveloped for MUD.

Thus, MUD lacks usable implementation in personal, home, and small businesses networks where IoT devices targeted at consumers have open ports, unpatched security bugs, and insecure password structures. Further, consumer routers focus mainly on authentication protocols, leaving access control managed poorly by the end-user. At the same time, industry MUD solutions are limited to ethernet-connected devices and do not provide connectivity compatibility for consumer solutions.

MUD must be able to be implemented on consumer routers to provide meaningful network security. Otherwise, the millions, possibly billions, of devices that exist on commercial IoT networks, where IoT botnets proliferate, will still pose a constant threat to the security and preservation of these networks. The lack of investment in consumer, home, and small business limits these solutions to be completely sustainable in the IoT space. The result is that there is no efficient system currently implemented that manages and automates access control on a personal network.

In the space of personal networks, wireless security is biased towards authentication rather than access control. Typically, on personal area networks (PANs) and local area networks (LANs), device network access is open and accessible. Networks assume the device will manage its access control and instead focus on ensuring the device is authenticated correctly to be on the network. Thus, unintended access to already authenticated IoT devices poses a significant security issue and is an oversight in the space of IoT. Due to the nature of IoT, IoT cannot be given inherent trust that it will function securely. Wireless security protocols such as Wi-Fi Protected Access (e.g., WPA, WPA2, and WPA3) are not enough if they can easily be circumvented by insufficient security practices at the device level and/or user error. Security standards must be focused beyond the traditional scope and adapt to the network space.

MUD can be adapted as one such solution. MUD works as intended when a device emits its own identity and complies with the MUD standard. However, there is no clear taxonomy of device behavior on a network, so not all devices comply. For example, some devices, such as general-purpose devices, have fewer access limits or no rules at all. Unfortunately, while MUD is effective at identifying known, participating IoT devices, it is not effective for identifying unattended, unknown, or non-compliant IoT devices that do not emit their identity via an encoded standard in an IoT network. Thus, MUD and similar architectures can benefit from a device taxonomy to identify network devices, further leading to better identification, better device specification, and better application of security policy. In summary, there is a need for an identification solution that identifies all types of IoT devices with improved accuracy and that provides defense-in-depth for Internet networks by enhancing standards like MUD.

INTRODUCTION

Disclosed is a deterministic, automated identification system and method that identifies IoT devices at improved accuracy by combining active and passive fingerprint techniques and packet analysis at the edge of an IoT network. The system provides an identification database model that allows access to further security implementations and a sustainable, scalable, and automated network security architecture for the Internet of Things.

Disclosed is an improved MUD-based architecture that is capable of proliferating just as rapidly as the IoT devices it supports. The embodiments herein leverage the robustness of MUD profiles and further provide a well-defined taxonomy for access control that is otherwise missing in the MUD standard for unattended, unknown, or non-compliant IoT devices. Embodiments identify unmanaged network devices, implement automated access control, and leverage backward compatibility paired with established authentication control policy (e.g., WPA2 and WPA3). Overall, embodiments demonstrate a security MUD architecture that can be implemented in a sustainable, scalable, and secure way.

For the MUD control flow to work with legacy devices, for example, a device must be appropriately identified and then apply a behavior-based profile. Device fingerprinting and profiling address this issue by profiling a standard functioning device to identify the device and then predict its behavior to a reasonable degree of certainty. Device fingerprinting combines specific attributes of a device to identify the device as a unique device, using identifying characteristics to make an informed guess, while device profiling learns the network patterns of the device to identify its type. If the MUD process is improved by first characterizing an IoT device's behavior in order to identify a legacy, non-compliant, or unknown device, a system can learn from that device behavior to service future IoT connectivity on an IoT network for scaling purposes.

Alternatively, or additionally, Software-Defined Networks (SDNs) can be used in concert with MUD to manage IP traffic on personal networks. SDNs can scale by attaching to current home/personal network setups and can automate the network functioning as the central network access server. After a device's behavior is specified, for example, using the MUD process, that specification can then be used to provide an accurate structure that can be used to categorize network behavior. Standards for SDNs based on MUD can be created to adapt a network security architecture for changing IoT needs. For example, a type of SDN, virtual networks, can be used in MUD implementations as a foundational tool in designing an architecture that is sustainable and secure.

An SDN can comprise two separate parts called the control plane and the data plane. The control plane provides layer-2 MAC reachability and layer-3 routing information to the data plane, which can be physical or virtual. The data planes' function is to forward network traffic decisions based on this routing information. Information passes via HTTPS, and SDNs forward flows or packets and frames based on attributes or tags connected to each frame. SDNs can be flexible, change quickly, and adapt to the network at hand. This can give freedom to manage resources via a centralized or decentralized control plane. SDNs also allow network administrators to directly arrange network services proactively.

Regardless of the implementation, device identification is a critical need in managing heterogeneous networks at scale. To that end, the core MUD process illustrated in FIG. 1 can be enhanced and incorporated into typical home IoT networks via software defined networking and machine learning to create appropriate access policies for improved network security. To accomplish this, the following embodiments describe an identity fingerprint matrix for IoT, a deterministic algorithm that combines active and passive fingerprint methods, and machine learning at an IoT network's edge to determine an IoT device's identity. Embodiments implementing the algorithm can identify devices with high accuracy. Embodiments of an automated system implement the algorithm to provide deterministic fingerprints for IoT devices that also pair a known behavior profile that can further be used to enforce security and privacy in an IoT network.

BRIEF DESCRIPTION OF THE DRAWINGS

The numerous advantages of the present invention may be better understood by those skilled in the art by reference to the accompanying drawings in which.

DETAILED DESCRIPTION

Figure 1:
FIG. 1 illustrates a core MUD process implementing RFC 8520, which can be enhanced and incorporated into typical home IoT networks to create access policies for improved network security.
Figure 1:
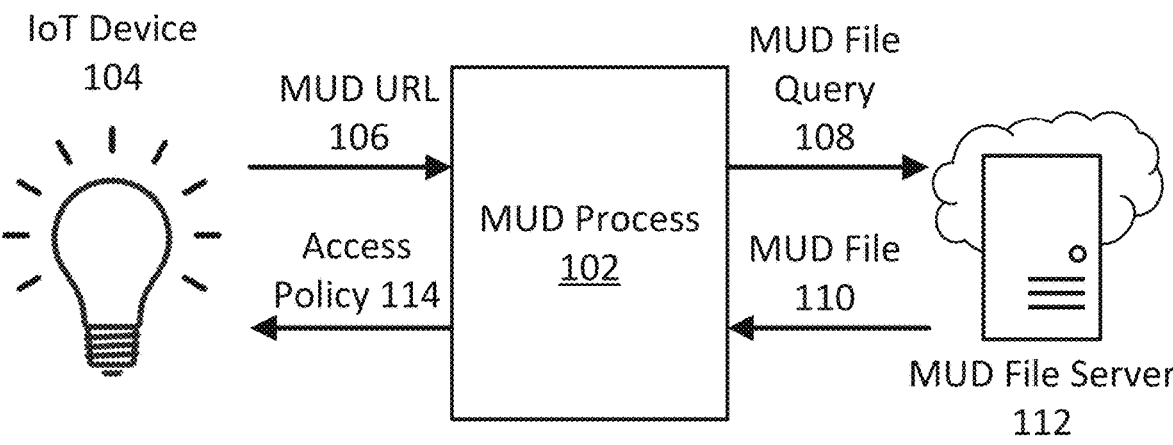

The invention summarized above may be better understood by referring to the following description, claims, and accompanying drawings. A description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to limit the present disclosure. As used herein, the singular forms "a," "an," and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first," "second," and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments. Furthermore, method embodiments are illustrated as examples, and process steps can be implemented in any order unless otherwise specified.

The state of the IoT networks lingers in uncertainty, remaining a constant threat to critical infrastructures. Millions of infected or vulnerable devices on networks can be employed as bots at any time. Security and privacy are at stake, and IoT standards and protocols lag behind in providing meaningful solutions. Behavior and specification-based protocols prove to be meaningful solutions, yet they rely on the complicity of the devices and manufacturers. The role of device identity on IoT networks that exist in hetero-geneous environments has become a major need for network security management. To appropriately protect and manage IoT networks, there is a need to know and trust what is on them. A sustainable, scalable, and secure network security architecture for IoT can be built that implements a unique method to identify IoT devices in a heterogeneous environment to enhance IoT cybersecurity.

Manufacturer Usage Description (MUD), illustrated in FIG. 1, can characterize a known IoT device via an industry-standard designated by the Internet Engineering Task Force (IETF) Request for Comments (RFC) standard 8520. The goal of MUD is to provide a means for end devices to signal to the network what sort of access and network functionality they require to properly function. Per RFC 8520, MUD consists of three architectural building blocks: 1) a URL that can be used to locate a description; 2) the description itself, including how it is interpreted; and 3) a means for local network management systems to retrieve the description.

MUD puts access control at the device level by having each device set its own rules for who and what can talk to it. MUD uses the device manufacturer as the authority and aims to allow manufacturers to identify their IoT devices and specify the intended network behavior of said devices. The network then uses this intent to author a context-specific access policy, so the device functions only within those parameters. In this manner, MUD becomes the authoritative identifier and enforcer of policy for devices on the network. In other words, MUD specifies the behaviors in an environment where a compliant device gives the identity. A MUD file made available by a manufacturer may offer some protection, but it does not eliminate the threat surface on a device, and certainly not to the network with which the device communicates.

With legacy or non-compliant devices, standards like MUD cease to function as a meaningful solution. Embodiments herein fill this gap by providing a tool to identify IoT devices in a heterogeneous network environment. Due to the proliferation of IoT devices, providing real-time, on-premises, identifying data of a continuously shifting heterogeneous network is considerably challenging. Current practices such as device fingerprinting and profiling address this issue by actively or passively scanning the device to identify the device and then predicting its behavior to a reasonable degree of certainty. Device fingerprinting, or combining specific attributes of a device to identify the device as a unique device, is a missing piece to improve security in IoT networks. Device fingerprinting attempts to identify characteristics to make an informed guess, while device profiling attempts to learn the network patterns of the device to identify its type.

Standards such as MUD have their strengths, but only as forward-looking standards because they do not account for legacy devices or future non-compliant devices. In current systems, there is no way to suggest the device's intended behavior without first identifying the device. Attestation to the device's identity must also occur in a zero-trust environment. Billions of IoT devices exist in obscurity surrounding their identity on the networks they exist on. Subsequently, they have no applicable schema to enforce personal local area networks security. To achieve defense-in-depth, the devices must be identified on the network first to apply an appropriate behavior profile. Automated identification implementing device fingerprinting, or combining specific attributes of a device to identify the device as a unique device, is the first step of the embodiments described herein to provide further defense-in-depth for IoT networks.

Figure 2:
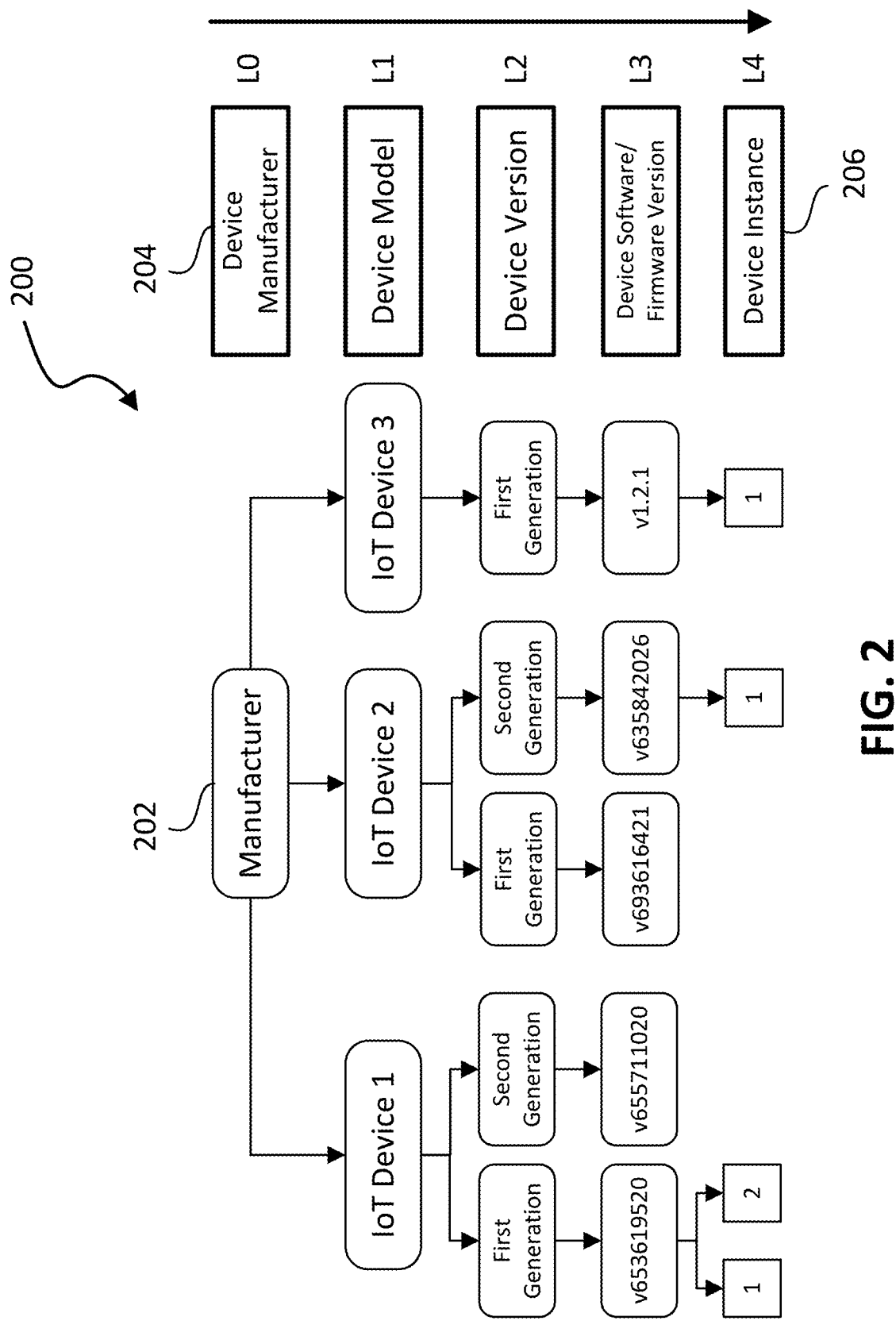
FIG. 2 illustrates a sample IoT device ontology, according to some embodiments.

IoT devices can be specified at varying degrees of granularity, where each distinct level of detail grows finer when descending an IoT device ontology. FIG. 2 illustrates a sample IoT device ontology 200, according to some embodiments. IoT devices are designed as specifically purposed devices as opposed to general-purpose devices, defined by a particular behavior originally set by the IoT manufacturer 202. At Level 0 (L0), the most general level is the device manufacturer level 204. The device manufacturer level 204 usually will describe which services and servers the device will connect to. Usually, the devices under the device manufacturer level 204 will communicate with the same subnets and may perform similar tasks. As the layers deepen, more specific behavior can be described. For example, Level 4 (L4) indicates the individual device instance 206 and encapsulates any distinguishable behavior between that device and another of the same type. In the case of FIG. 2, differentiations between individual devices on a network may share similar behavior but the behavior becomes more distinct at the precise layer that describes the unique device. The more granularity, the more expected behavior can be extracted from the device.

Device fingerprinting uses identifying characteristics such as packet header data to make an informed guess on the identity of a device. The identifying characteristic is akin to a physical fingerprint and can be used to substantiate the device's identity. Device fingerprinting is the same method used to distinguish IoT targets for botnets. There are also tools that attempt to identify network devices using network communication patterns. There are many diverse forms of fingerprinting, such as techniques to discern a device's browser, hardware, operating system, and Transmission Control Protocol/Internet Protocol (TCP/IP) stack. Embodiments herein can create a unique device fingerprint to ascertain an IoT devices' identity at differing levels of confidence and granularity.

Device profiling or behavior profiling attempts to create a profile of a device's unique behavior. Device profiling, in this context, is particular to IoT devices because IoT devices provide specific functions and applications and are designed in a particular way that provides unique behavior. Two example types of device profiling are network-based and host-based device profiling. Network-based device profiling for IoT employs contextual information about the device, such as login requests, access durations, locations, network traffic sources and destinations, authenticated access, port access, authorized domains and services, protocols used, and other network traffic analyses. Host-based behavioral profiling uses assumptions about how the host uses the device, such as when the device is used, what locations, what time of day, how much data is sent or received, how frequently the device pings, and other general usage information. Host-based and network-based profiles can also be combined to create a unique behavior profile. Device profiling ultimately explains how the device is expected to behave in context. MUD uses behavior profiles to enforce network access based on the device's intended usage. Device profiling can also identify a device or attest to a device's discovered fingerprint.

Classification and identification are two different ways to distinguish and describe systems. Classification sorts things into groups or categories, while identification describes the device in a detailed way that can be recognized in a specific context. For example, an identity for an IoT device can be a GoPro web camera, while the class would be a web camera. Due to the heterogeneity of IoT, devices may be in the same category or class, but their behavior may differ largely without tying a specific identity to it. Embodiments herein focus on identification because classification of a device can be performed along with identification of the device. Classes of IoT are still broad, limiting the ability to apply behavior-based rules. With the device's identity, a level of granularity (as exemplified in FIG. 2) helps to provide meaningful results. Once the device is identified, appropriate security can be applied.

For the device identification process described and illustrated in the following figures, embodiments implement approaches of fingerprinting and profiling to identify devices in a heterogeneous environment of a typical consumer IoT network.

Figure 3:
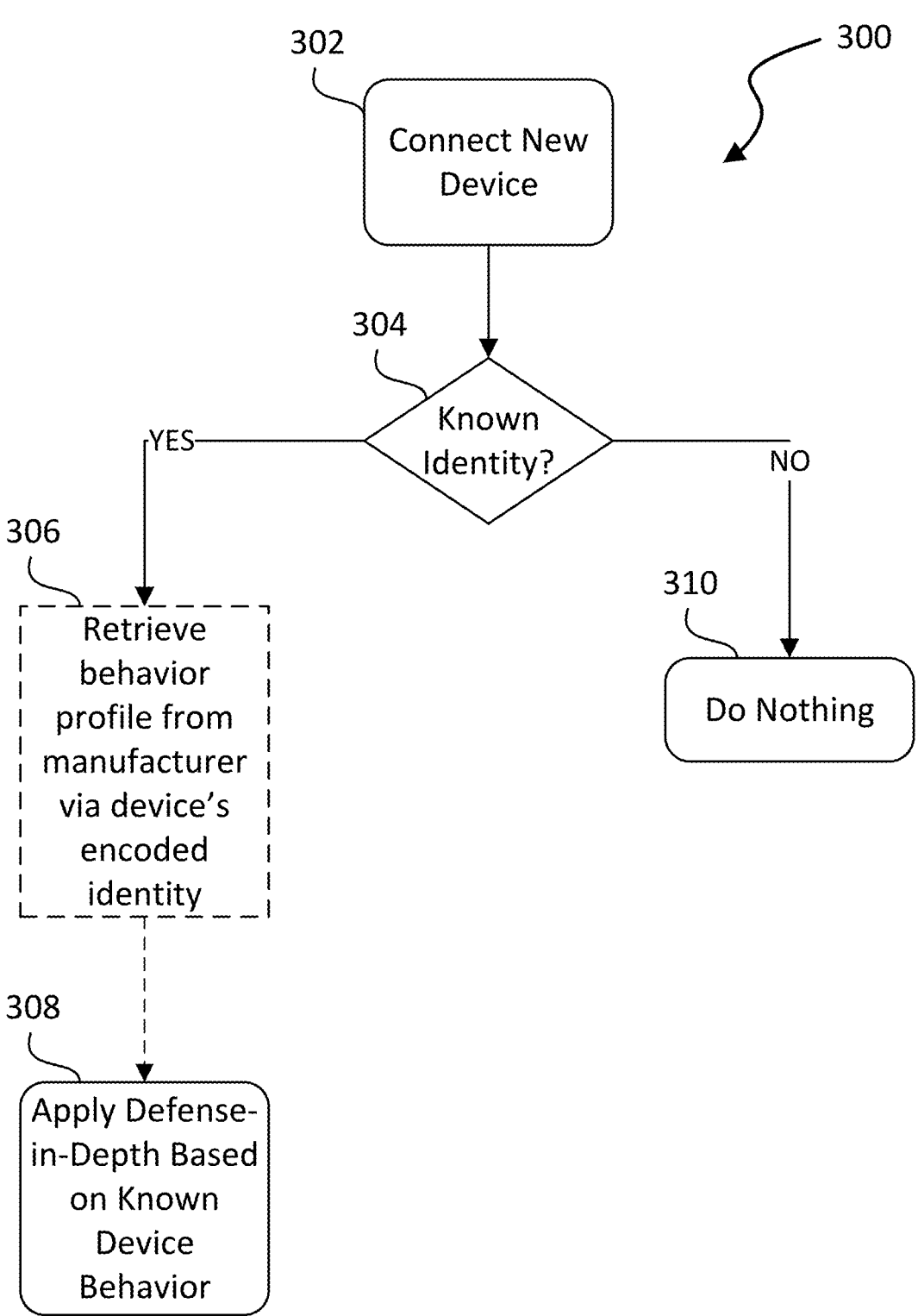
FIG. 3 illustrates the problem that device-specific security cannot be applied in practice for an IoT device on an IoT network when there is no known device identity.

FIG. 3 is a flowchart 300 that illustrates the problem that device-specific security cannot be applied in practice for an IoT device on an IoT network when there is no known device identity. In some embodiments described herein, when a new device connects to a network (302) with a known encoded identity (304), the process can use the device's encoded identity to retrieve a behavioral-based specification or behavior profile (306), such as that produced by MUD, that is linked to that device's encoded identity. In this way, the identification process enables the application of defense-in-depth (308) by applying the behavior profile to determine behavioral-based security policies. But, as in step 310, when an IoT device has no identity, this cannot happen, and the process does nothing in the way of applying security for the new device.

Currently, IoT networks exist in a state where many devices' behavioral identity is unknown. These devices are referred to as legacy or non-compliant devices as they do not emit a behavioral identity based on approved standards. Although some embodiments may utilize machine learning (ML) to assist in identifying a device, for example, when there are no approved standards, using ML alone may require a level of overhead that is unreasonable for a practical, sustainable identification solution. Embodiments herein implement a sustainable method that does not require ML to identify a device on standard IoT networks but can further benefit from ML for refining device identification.

Figure 4:
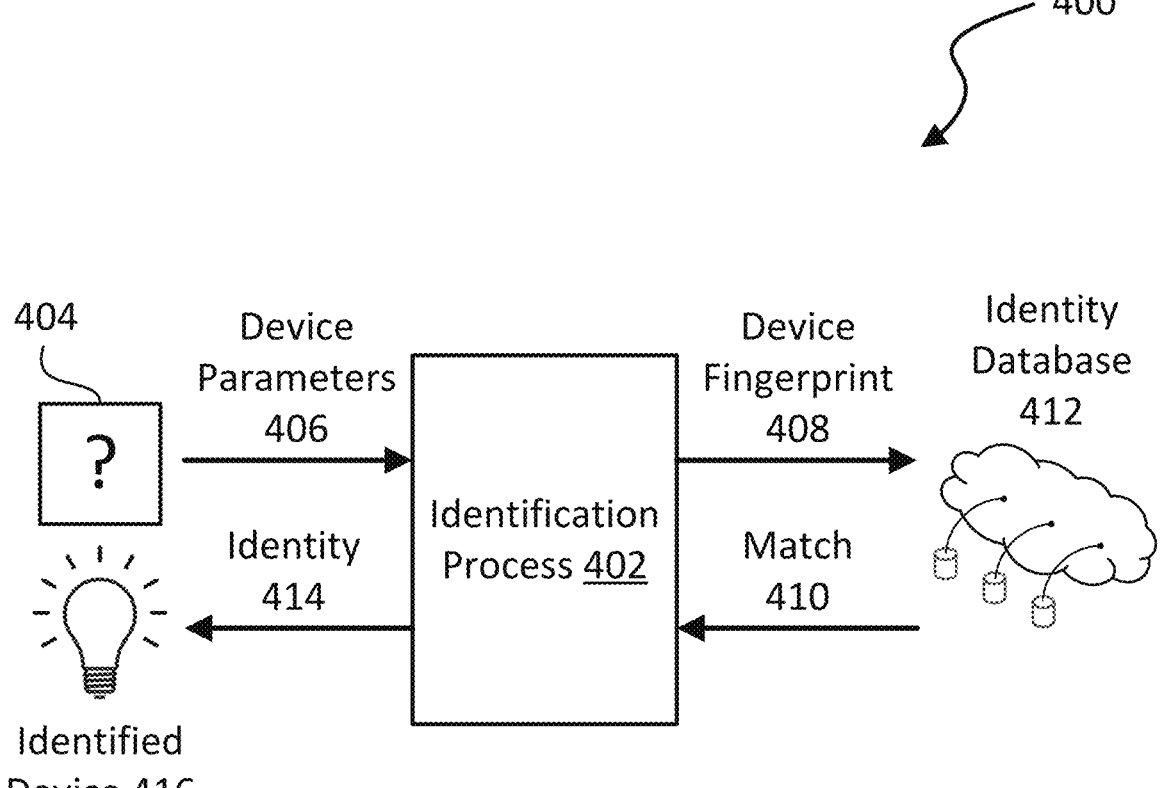
FIG. 4 illustrates the application of an identification process for identifying non-compliant and unknown IoT devices in an IoT network, according to some embodiments.
Figure 5:
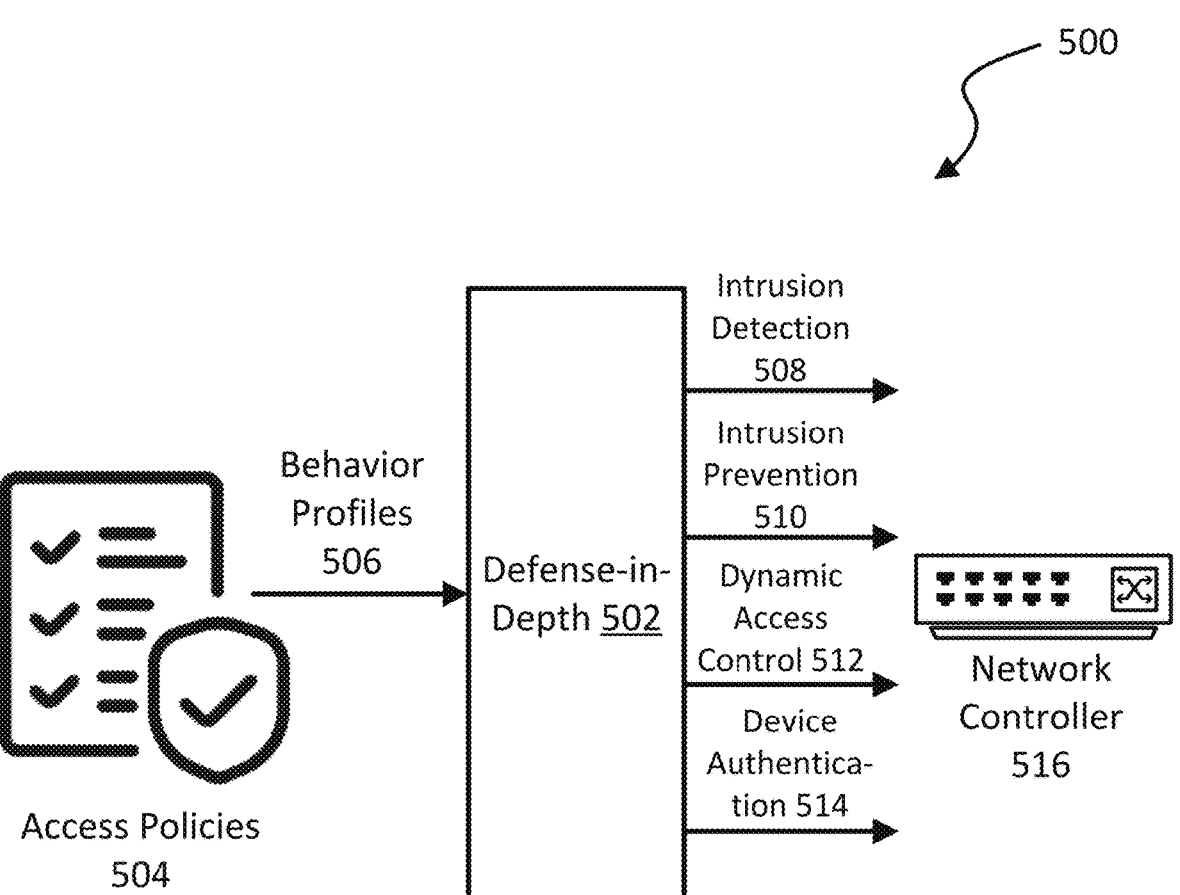
FIG. 5 illustrates the application of a defense-in-depth process to automatically generated access policies and correlated behavior profiles that layers security methods for improved network security at an IoT network controller, according to some embodiments.

FIGS. 4 and 5 illustrate a two-pronged approach based on the use of MUD, as illustrated in FIG. 1, for determining device-specific security. First, FIG. 4 illustrates the application of an identification process 400 for identifying non-compliant and unknown IoT devices in an IoT network, according to some embodiments. Where an IoT device is non-compliant and does not emit its identity via an encoded standard, it is considered unknown 404. Starting from when an unknown 404 or non-compliant device connects to an IoT network, the device's parameters 406 are analyzed by identification process 402. Identification process 402, as further illustrated in FIG. 7 below, can perform active fingerprinting, passive fingerprinting, and/or packet analysis at the edge. Active fingerprinting is performed by actively sending a packet (e.g., pinging an IoT device) and listening for the response. Passive fingerprinting is performed by passively reading packets on the network, for example, by listening for DHCP response packets sent by individual IoT devices, or otherwise reading data output by IoT devices on the network. Metrics from these processes are combined into a unique device fingerprint 408 that is then compared with an identity database 412 to produce a match 410 and identify the previously unknown device 404 with identity 414. The identified device 416 is also paired with a behavior profile, as further illustrated in FIG. 6 below, based on its identity 414.

FIG. 5 illustrates a defense-in-depth process 500 applied to automatically generated access policies 504 and correlated behavior profiles 506, based on the identity 414 of the identified device 416 in FIG. 4, according to some embodiments. The defense-in-depth process 500 can layer security methods for improved network security at an IoT network controller 516, according to some embodiments. Utilizing the combined aspects of FIG. 1 and FIG. 4, defense-in-depth 502 can be applied to an IoT system through a modified network security architecture. Using the identity 414 and behavior profiles 506 (see FIG. 5) of identified device 416, as provided by or through access policies 504, various security methods can be layered. The security methods can be correlated to and selected as appropriate for the identified device's 416 identity 414 and behavior profiles 506. The security methods can be enforced by network controller 516, which can be a dedicated software defined network controller, for example. The network controller 516 can implement intrusion detection 508, intrusion prevention 510, dynamic access control 512, device authentication 514, for example, and other security methods for attestation of identified device 416.

By incorporating and enhancing network security standards by the processes of FIGS. 4, 6, 7, 8, and 9, a flexible and modular network security architecture can be created that accounts for existing IoT devices and is also forward-looking for new IoT devices that are added to a network in the future. Embodiments of the algorithms described herein can identify devices with high accuracy. Further, in the process of FIG. 5, utilizing network technologies such as software defined networks allows adaptive networks that automate and enhance network security and privacy.

Figure 6:
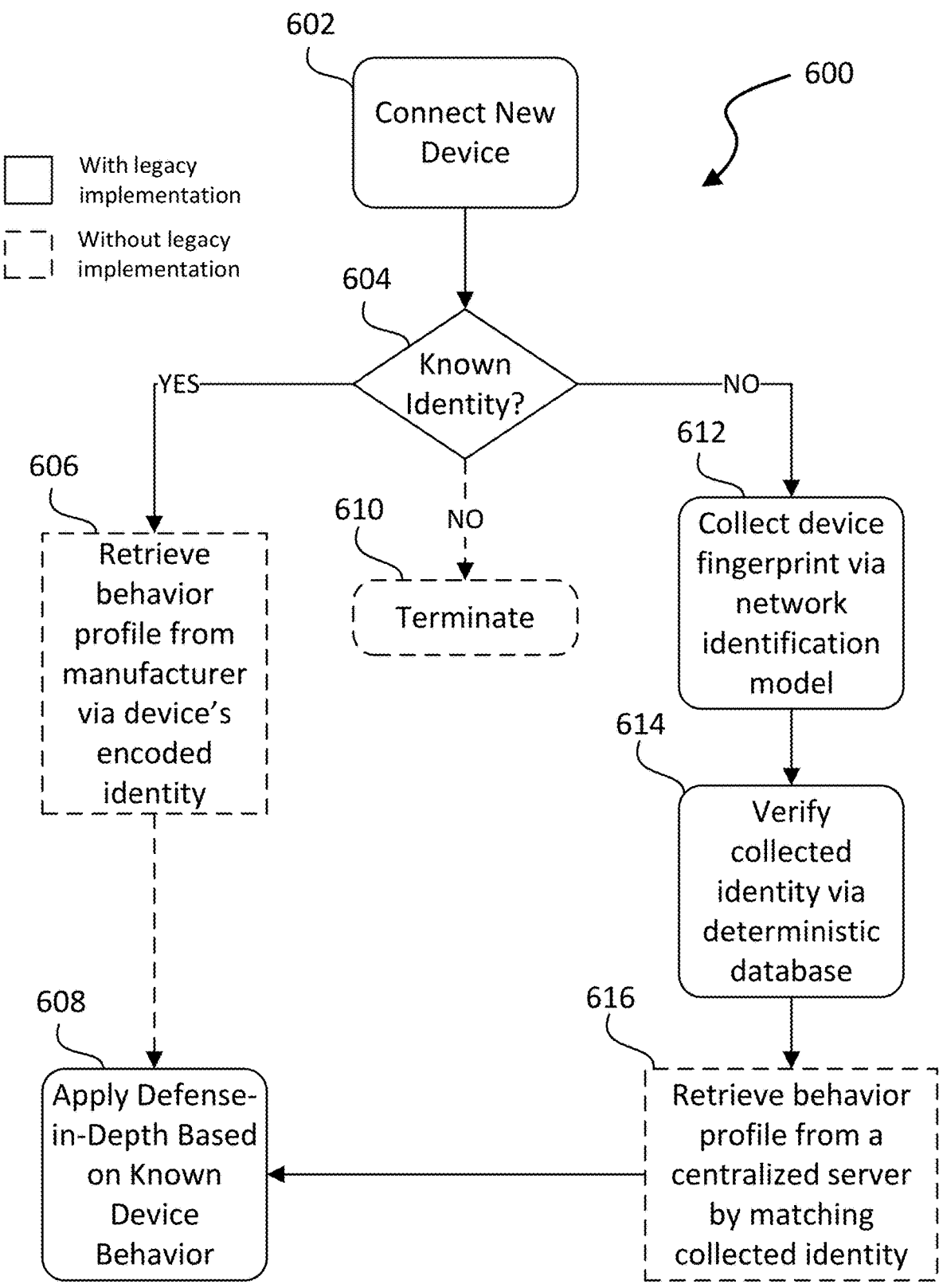
FIG. 6 is a flowchart that illustrates how a legacy implementation allows for defense-in-depth in an IoT network even for non-compliant IoT devices, according to some embodiments.

FIG. 6 is a process 600 that illustrates how a legacy implementation allows for defense-in-depth in an IoT network even for non-compliant IoT devices, according to some embodiments. The process 600 of FIG. 6 allows for the creation of an Identity Fingerprint Matrix for IoT. Within process 600 is an algorithm (see also FIGS. 7-11) that deterministically identifies IoT in a heterogeneous network environment. Multiple active and passive fingerprinting methods are combined to create a unique device fingerprint for an IoT device that is attached to its identity. These fingerprints are then compared to a known trusted fingerprint database, which is, for example, MUD-oriented, to match the IoT device's identity. After an IoT device is identified, combined device profiling and behavioral analysis methods are used to attest to the IoT device's collected identity and to provide defense-in-depth for that IoT device (and for similar IoT devices) on the IoT network.

In FIG. 6, similar to FIG. 3, when a new device connects to a network (602) with a known encoded identity (604), process 600 can use the device's encoded identity to retrieve a behavioral-based specification or behavior profile (606), such as that produced by MUD, that is linked to that device's encoded identity. In this way, the identification process enables the application of defense-in-depth (608) by applying the behavior profile to determine behavioral-based security policies. But, as in step 610, without Identity Fingerprint Matrix for IoT (i.e., without implementing a way to handle legacy or non-compliant IoT devices), when an IoT device has no identity, this cannot happen, and the process terminates (610), doing nothing in the way of applying security for the new device.

Steps 612-616 illustrate the process 600 when the algorithm of an IoT system determines an identity for the IoT device in an alternate manner, including when the IoT device is a legacy or non-compliant device. When the Identity Fingerprint Matrix algorithm is implemented, in step 604, and an IoT device is determined to not have a known identity, instead of terminating the process in step 610 (similarly to step 310), the IoT system collects (612) an IoT device fingerprint via the network identification model, for example, by performing the methods illustrated in FIGS. 7 and 8, according to some embodiments. The system, via the Identity Fingerprint Matrix, then verifies (614) the collected identity (i.e., the collected device fingerprint) via comparison to identity data in a deterministic database. When a match is found, the system retrieves (616) a corresponding behavior profile for the matched identity data from a centralized server and assigns the behavior profile to the IoT device. With the identity of the IoT device now known, and with a behavior profile assigned, the system applies (608) defense-in-depth based on the now known IoT device behavior.

In this way, process 600, implements a first level of fingerprinting at the network and transport layers of the IoT network, using network access layer analysis to determine the collected device fingerprint. As detailed in FIG. 7, this first level of fingerprinting combines at least two identification processes, an active IoT fingerprint and a passive IoT fingerprint, on-premises, based on trusted information in a centralized database. Process 600 further implements a second level of fingerprinting, as detailed in FIG. 8, using packet scanning and analysis of each DHCP request at the high-level application layer, to evaluate the identity of an IoT device upon initial connection or reconnection to the IoT network.

In some embodiments of a method that combines the first and second levels of device fingerprinting, the TCP/IP stack is analyzed to determine the protocol that a connecting IoT device is encoded to communicate. The TCP/IP stack uses header or banner data to capture packet patterns. When instantiating on an IoT network, an IoT device emits information in these packet patterns. This information is added to the centralized database. The collection of these packet patterns allows identification of IoT devices that may be unknown, that is, that are legacy or non-compliant IoT devices. Packet analysis can be performed using tools such as Nmap, tshark, or tcpdump, for example. Using such tools, a script for collecting banner data of an IoT device can be, for example:

```
sudo nmap -sV -script=banner 192.168.1.31 - Collects Banner Data
of device tshark -i 3 -f "host x.x.x.x" -w test.pcap
```

Figure 7:
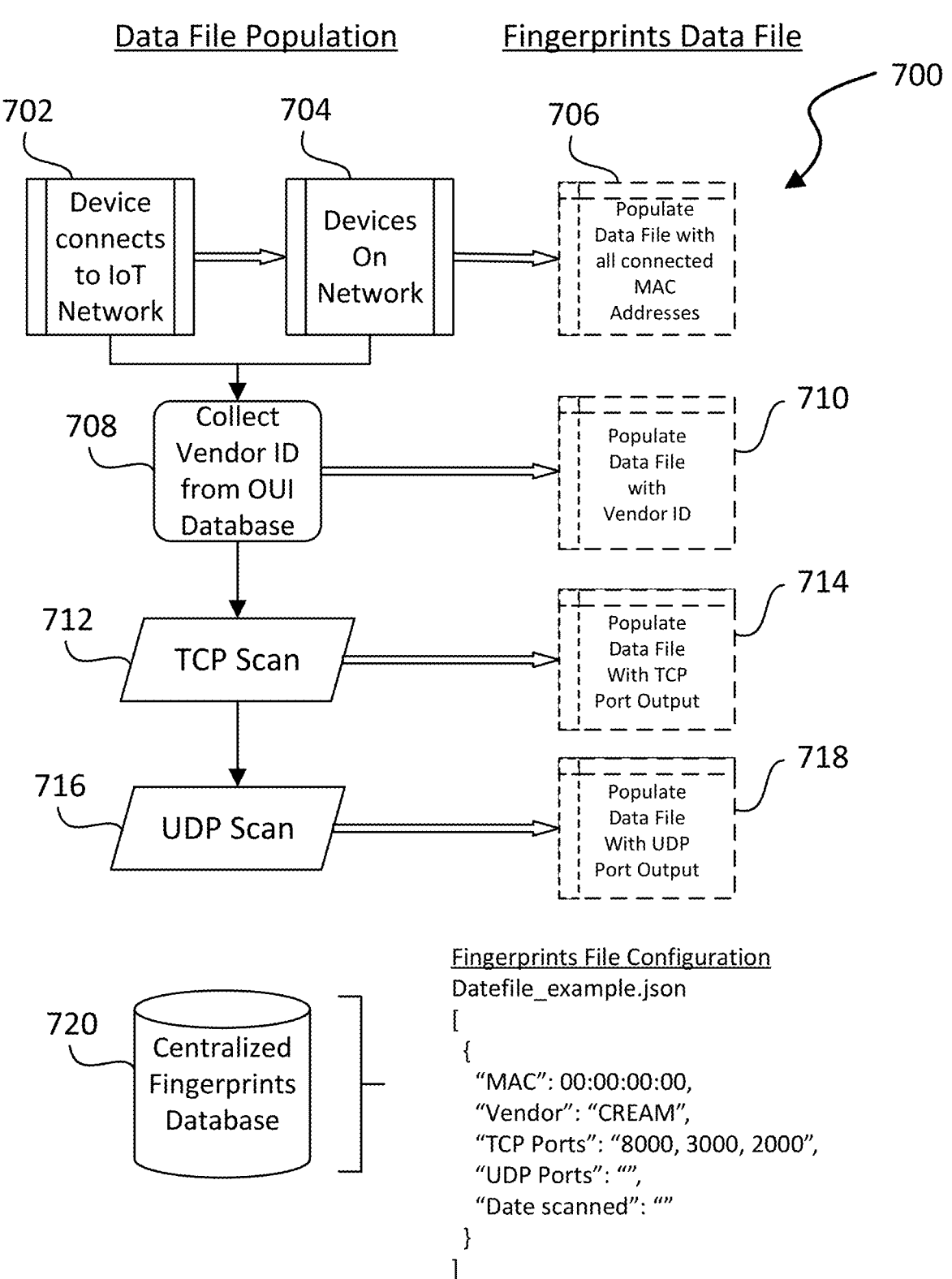
FIG. 7 is a process diagram illustrating active IoT fingerprinting, according to some embodiments.

FIG. 7 demonstrates the use of active port scanning (first level of device fingerprinting), and FIG. 8 demonstrates the use of passive packet scanning (second level of device fingerprinting) to map collected packet data to an identity fingerprint. FIG. 9 illustrates the combined processes of FIGS. 7 and 8, according to some embodiments. The information determined by these process steps is compared with identity fingerprints of the same IoT device stored in the centralized database. Once the IoT device's identity is verified, a corresponding behavior profile, further stored in the centralized database, can be retrieved and applied to modify the access control of the IoT device and further provide appropriate defense-in-depth for the characteristics of the IoT device on the specific IoT network. Defense-in-depth involves protecting an IoT network under several layers of cybersecurity protocols, rather than relying on a single protective measure.

In some embodiments, by combining the methods of fingerprinting of FIG. 7 and FIG. 8 (as FIG. 9, for example), the system can attest to a known identity with greater accuracy than each method alone or as known in the art. The combined methods of FIGS. 7 and 8 provide granularity up to the instance level for an IoT device logged in the centralized database. Each of FIGS. 7, 8, and 9 will now be described in detail.

The method of FIG. 7 implements active fingerprinting and scanning to create port maps for each device and compares the port maps to known configurations of IoT devices. The method of FIG. 7 can also implement an aspect of passive fingerprinting, using the Organizational Unique Identifier (OUI) that is hard-encoded in the media access control (MAC) address of the IoT device and accessible by pinging the IoT device. The OUI serves as an identifier of the IoT device to further isolate the identification of the IoT device to a single IoT device of the known configurations. This identifier can be processed by comparing it to data in a confidence database to determine the IoT device's identity at the highest confidence level.

Specifically, FIG. 7 is a process diagram 700 illustrating active IoT fingerprinting, according to some embodiments. The method used for active fingerprinting includes Address Resolution Protocol (ARP) scanning, creating UDP/TCP port maps for each IoT device, and comparing this information to known configurations of IoT devices. The left side of the process diagram 700 illustrates sub-process steps for data file population during the active IoT fingerprinting process, and the right side of the process diagram 700 illustrates the population of the fingerprints data file in the centralized fingerprints database 720 as a result of the data file population sub-process steps. An aspect of passive fingerprinting, using the hard-coded OUI in the MAC address, provides further granularity in combination with (and comparison with) the output of the active fingerprinting. This process can be implemented for instances including TCP, Spanning Tree Protocol (STP), MAC, DHCP request, DHCP options, DHCPv6 options, TCP sockets, and SNMP, for example.

In step 702, an IoT device connects to an IoT network, and its MAC address is read. For the devices on the IoT network 704, including the connecting IoT device, in step 706, a data file can be populated in the fingerprints database 720 with the MAC addresses of all connected devices. In step 708, a vendor ID for all connected devices, including the connected IoT device from step 702, is collected from an OUI database by matching the OUI in each MAC address to an OUI in the OUI database and fetching an associated vendor ID. In step 710, the data file can be populated with the collected vendor ID(s) in the fingerprints database 720.

In step 712, a TCP scan is performed, which, in step 714, populates the data file in the fingerprints database 720 with the TCP port output. The TCP scan is a process that sends client requests to a range of server port addresses on a remote IoT device to find an active port, e.g., to determine services available on the remote IoT device. The result of a scan on a port can be generalized into one of three categories at the TCP port output:

| State | Response |
|---|---|
| open | Response indicates a service is listening on the port |
| closed | Response indicates that connections will be denied to the port |
| filtered | No response received from remote IoT device |

If a port is open, the operating system completes a TCP three-way handshake, and the port scanner immediately closes the connection to avoid performing a Denial-of-Service attack.

For a SYN scan, another form of TCP scanning, rather than using the operating system's network functions, the port scanner generates raw IP packets itself and monitors for responses, but it does not open a full TCP connection. The port scanner generates a SYN packet. If the target port is open, it will respond with a SYN-ACK packet. The scanner host responds with an RST packet, closing the connection before the handshake is completed. If the port is closed but unfiltered, the target will instantly respond with an RST packet, for example.

In step 716, a User Datagram Protocol (UDP) scan is performed, which, in step 718, populates the data file in the fingerprints database 720 with the UDP port output. UDP scanning is a process to scan for UDP services that are being deployed on the IoT system or are currently in a running state. Because UDP is a connectionless protocol, it can be more difficult to probe than TCP. In a UDP scan, a tool such as Network Mapper (Nmap) can be used to send UDP datagrams to target UDP network services such as Domain Name System (DNS), Simple Network Management Protocol (SNMP), and DHCP and wait for a response. A UDP scan sends a UDP packet to every targeted port with or without a protocol-specific payload. Based on the response, the port is assigned one of four states. For example, using Nmap, the UDP port output may be:

| State | Response |
|---|---|
| open | Any UDP response |
| open \| filtered | No response registered |
| closed | ICMP port unreachable error (type 3, code 3) |
| filtered | Other ICMP unreachable errors (type 3, code 1, 2, 9, 10, or 13) |

For UDP scanning, the service sends a generic UDP packet and waits for a response. If there is no response, the port is assumed to be open and a UDP packet specific to the service on that port is sent to detect the service. If an Internet Control Message Protocol (ICMP) error packet is returned, the port is considered closed.

Scanning of the TCP and UDP ports can be performed serially or in parallel, according to some embodiments. Parallel scanning can decrease the amount of time required to complete the process illustrated in FIG. 7, for example. Further, open and filtered ports may be ignored. Additionally, multiple scans may be taken at various periods of time.

The centralized fingerprints database's primary function is to serve as a live database aggregating all known data about IoT devices. This includes information from scans (e.g., TCP and UDP scans) and identity and behavior profiles of the IoT devices. This database can compare and attest for an identity given a certain confidence level for each IoT device. In some cases, the same manufacturer will use the same ports for the different IoT devices, resulting in the same identity. For example, Google Home and Google Chromecast may receive the same identity. In cases of collisions, the highest level of identity is noted with possible overlaps. This prevents legacy devices or anything on TCP/IP that does not emit its identity from claiming the same identity.

Figure 8A:
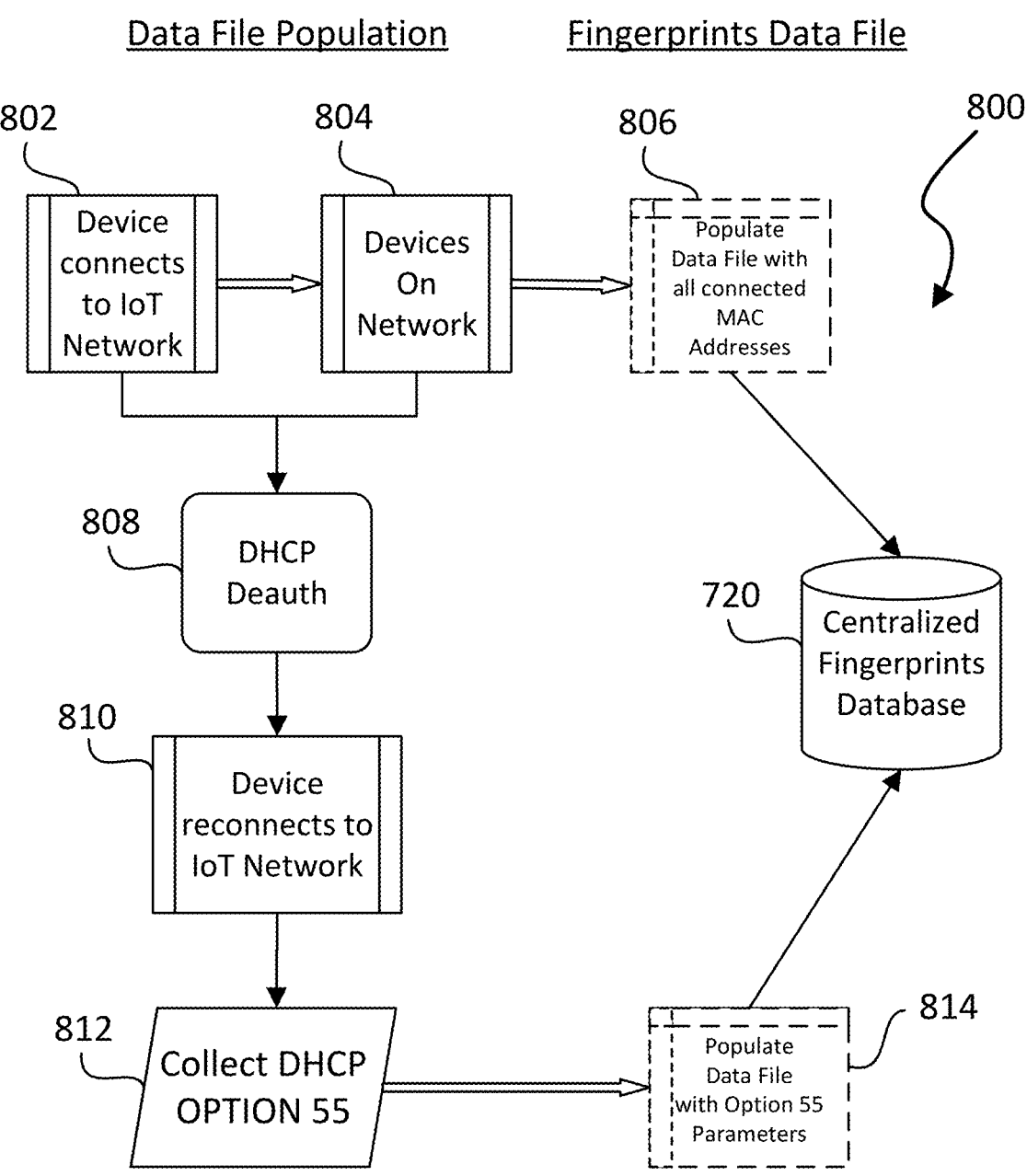
FIG. 8A is a process diagram illustrating a method for passive IoT fingerprinting, according to some embodiments.
Figure 9:
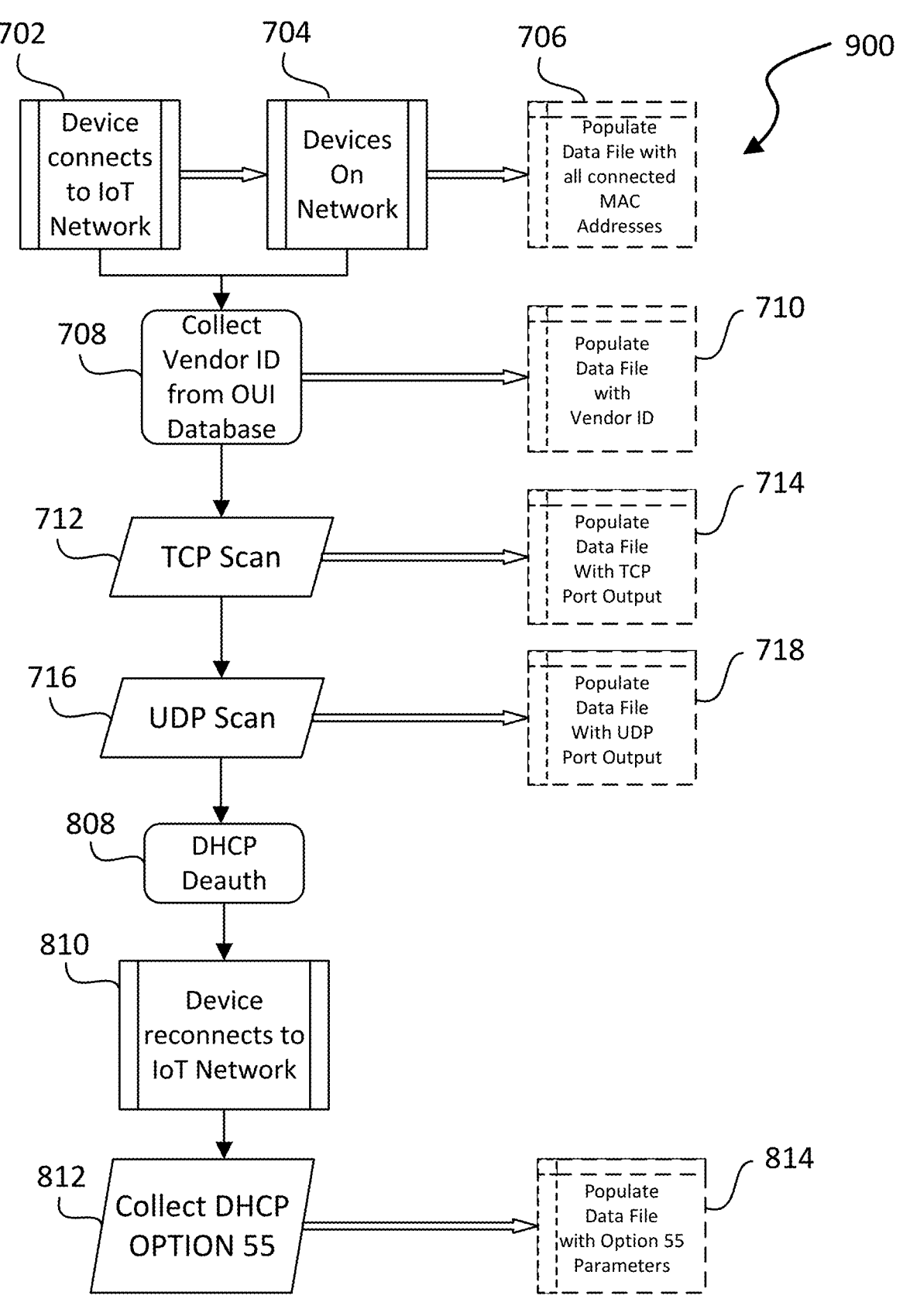
FIG. 9 is a process diagram illustrating creation of an identity fingerprint matrix for IoT, according to some embodiments.

FIG. 8A is a process diagram 800 illustrating passive IoT fingerprinting, according to some embodiments. Although passive, this level of fingerprinting requires a more intensive approach of packet analysis at the high-level application layer. This process includes packet scanning each device DHCP request on initial connection to the IoT network or upon reconnection to the IoT network after a strategic and authorized WiFi de-authentication attack. The process of FIG. 8A may be implemented for protocols including ARP, Logical Link Control (LLC), IP, ICMP, Extensible Authentication Protocol over Local Area Network (LAN), or EaPol, TCP/UDP, HTTP(S), DHCP, Bootstrap Protocol (Bootp), Simple Service Discovery Protocol (SSDP), DNS, Multicast DNS (MDNS), and Network Time Protocol (NTP), for example.

Continuing to refer to FIG. 8A, in step 802, an IoT device connects to an IoT network. In step 804, with the IoT device joining other devices on the IoT network, the system populates (806) a data file in the centralized fingerprints database 720 with the MAC addresses of all connected devices. In step 808, the system performs a DHCP deauthorization process of the IoT device on the IoT network. In step 810, the IoT device reconnects to the IoT network, which initiates packing scanning and collects DHCP Option 55 parameters from the IoT device in step 812. In step 814, the DHCP Option 55 parameters are populated in the data file on the fingerprints database 720 as a fingerprint of the IoT device.

The DHCP option 55 parameter request list items include:
(1) Subnet Mask
(3) Router
(6) Domain Name Server
(15) Domain Name
(31) Perform Router Discover
(33) Static Route
(43) Vendor-Specific Information
(44) NetBIOS over TCP/IP Name Server
(46) NetBIOS over TCP/IP Node Type
(47) NetBIOS over TCP/IP Scope
(119) Domain Search
(121) Classless Static Route
(249) Private/Classless Static Route (Microsoft)
(252) Private/Proxy autodiscovery The identification process in FIG. 8A utilizes the DHCP discovery process (i.e., DCHPDISCOVER). When a device is connected to a network, the device checks whether a valid IP configuration is available. If a valid IP configuration is not available, the device generates a special message known as a DHCPDISCOVER message and broadcasts this message on the local LAN segment. In this message, the device uses the addresses 0.0.0.0 and 255.255.255.255 in the source and destination address fields, respectively. The 0.0.0.0 and 255.255.255.255 are two special addresses used to send local broadcast messages. From these addresses, 0.0.0.0 is used as the source address. If a device does not have the source address, it can use this address to send broadcast messages. 255.255.255.255 is the local broadcast address. Any message sent to this address is received by all hosts (e.g., a DHCP server, which can be hosted on a WiFi router) of the local network. DHCPDISCOVER messaging requires an IoT device to authenticate or reauthenticate (simplified as reconnecting).

Figure 8B:
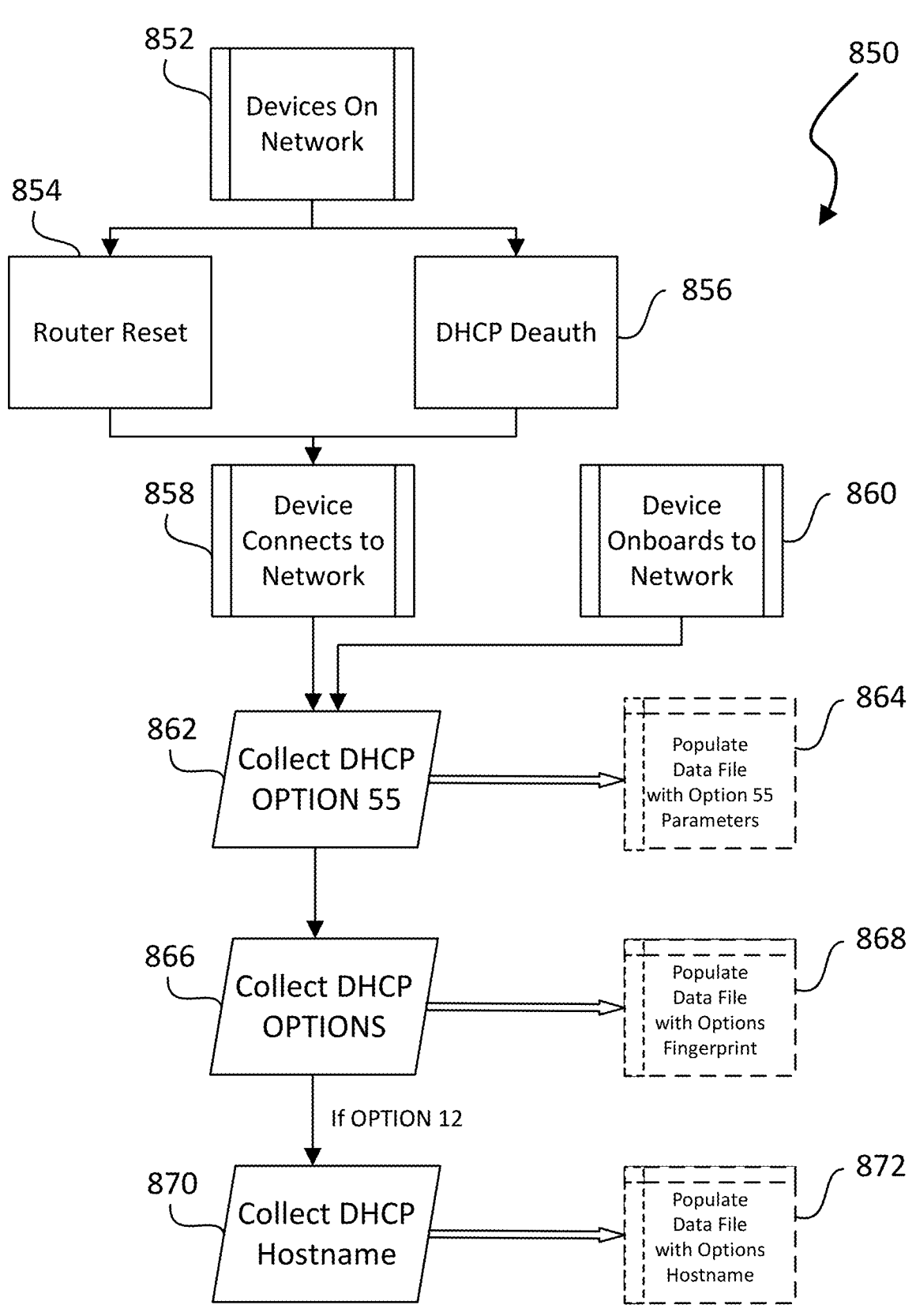
FIG. 8B is a process diagram illustrating an alternate method for passive IoT fingerprinting, according to some embodiments.

FIG. 8B is a process diagram 850 illustrating an alternate method for passive IoT fingerprinting, according to some embodiments. FIG. 8B involves soft-resetting a WiFi router. In step 852, starting with IoT devices on the IoT network, the WiFi router is reset (854). Additionally, in step 856, the system performs a DHCP deauthorization process for the devices. The IoT device being fingerprinted reconnects to the IoT network in step 858 and onboards to the IoT network in step 860. Once reconnected and onboarded, the system initiates packing scanning and collects DHCP Option 55 parameters from the IoT device in step 862. In step 864, the DHCP Option 55 parameters are then populated in the data file of the fingerprints database 720. Further, the fingerprinting process includes collecting DHCP Options (866) and populating those options in the data file of the fingerprints database 720 as an options fingerprint (868). If Option 12 exists, the method then collects a DHCP hostname (870) and then populates the data file of the fingerprints database 720 with the options hostname (872). At the end of the process, Option 12 can be used to compare the IoT device's hostname to that of an active fingerprint in the fingerprints database 720. If the Option 12 parameter has no match for the hostname, the IoT device can be flagged.

Alternatively, or additionally, when collecting the DHCP Options 866, certain options can be ignored and removed from the fingerprinting process if they are configurable, because they could be ripe for tampering. These options can include DHCP Option 50 (Request IP address, for a hard-coded IP address), DHCP Option 54 (Server Identifier), and DHCP Option 12 (Hostname).

FIG. 9 is a process diagram 900 illustrating IoT fingerprinting to generate an IoT Fingerprint Matrix, according to some embodiments. FIG. 9 illustrates the combination of the fingerprinting methods of FIGS. 7 and 8, for example. A person having ordinary skill in the art would understand that the steps of the methods in FIGS. 7, 8, and/or 9 can be performed in various other orders or with additional or fewer steps to achieve an IoT device fingerprint within the scope of this disclosure.

Figure 10:
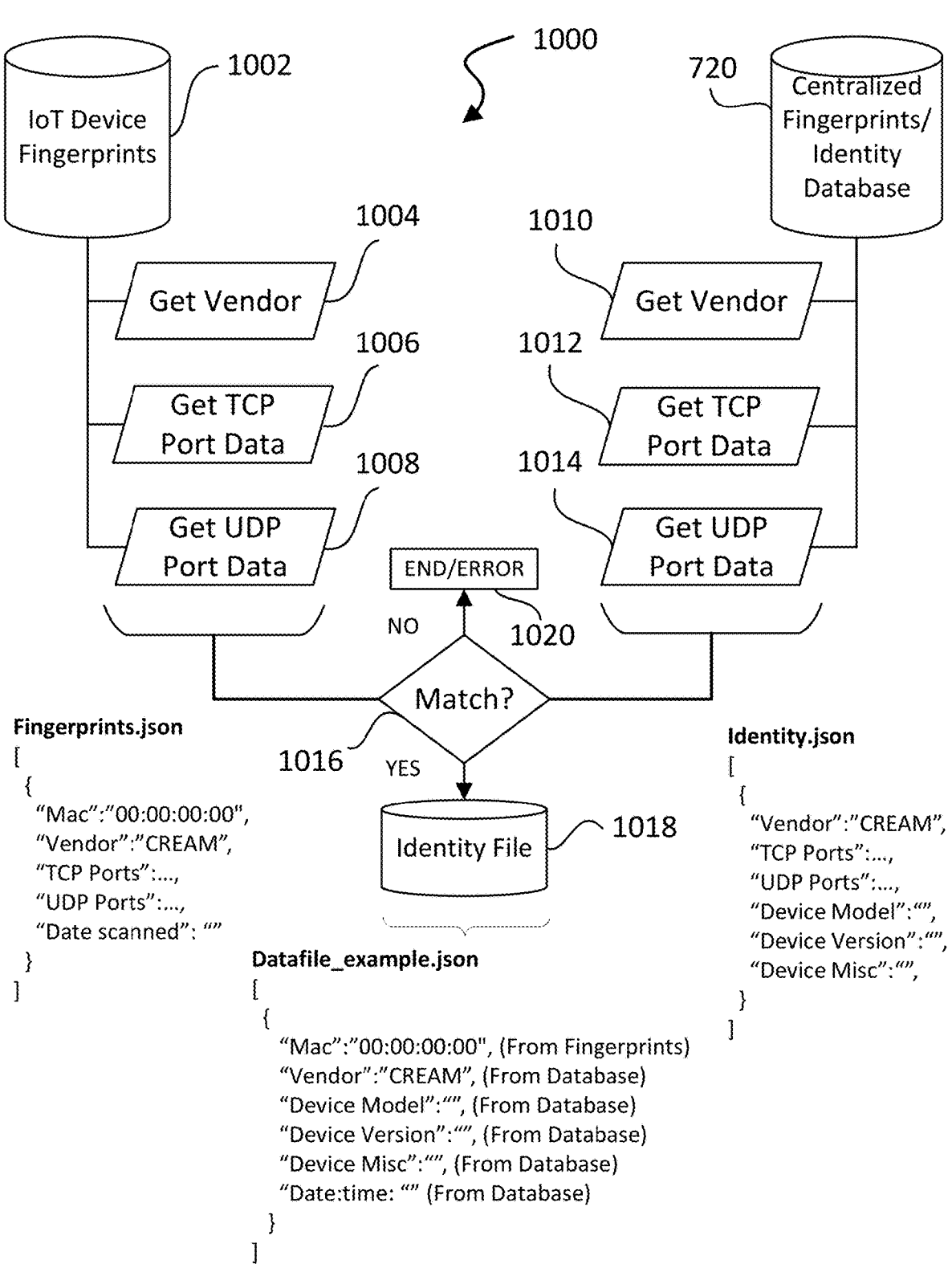
FIG. 10 illustrates a method to compare IoT device fingerprints with a central fingerprints database/identity structure, according to some embodiments.

FIG. 10 illustrates a method 1000 to compare IoT device fingerprints with a central fingerprints database/identity structure, according to some embodiments. Data representing the IoT device fingerprints 1002 is stored in the IoT device. In step 1004, the vendor of the IoT device is retrieved from the IoT device fingerprint, similarly to that illustrated in FIG. 7, step 708. In step 1006, TCP port data is retrieved from a TCP port scan (see FIG. 7, step 712). In step 1008, UDP port data is retrieved from a UDP port scan (see FIG. 7, step 716). In step 1016, a match of the vendor (1010), TCP port data (1012), and UDP port data (1014) is determined from searching and reading the corresponding information in the centralized fingerprints (identity) database 720. If a match is found, an identity datafile 1018 is created for the IoT device. FIG. 10 further illustrates how the JSON identity datafile is created from the matched data in the IoT device's fingerprints JSON datafile and the identity database's JSON datafile.

Figure 11:
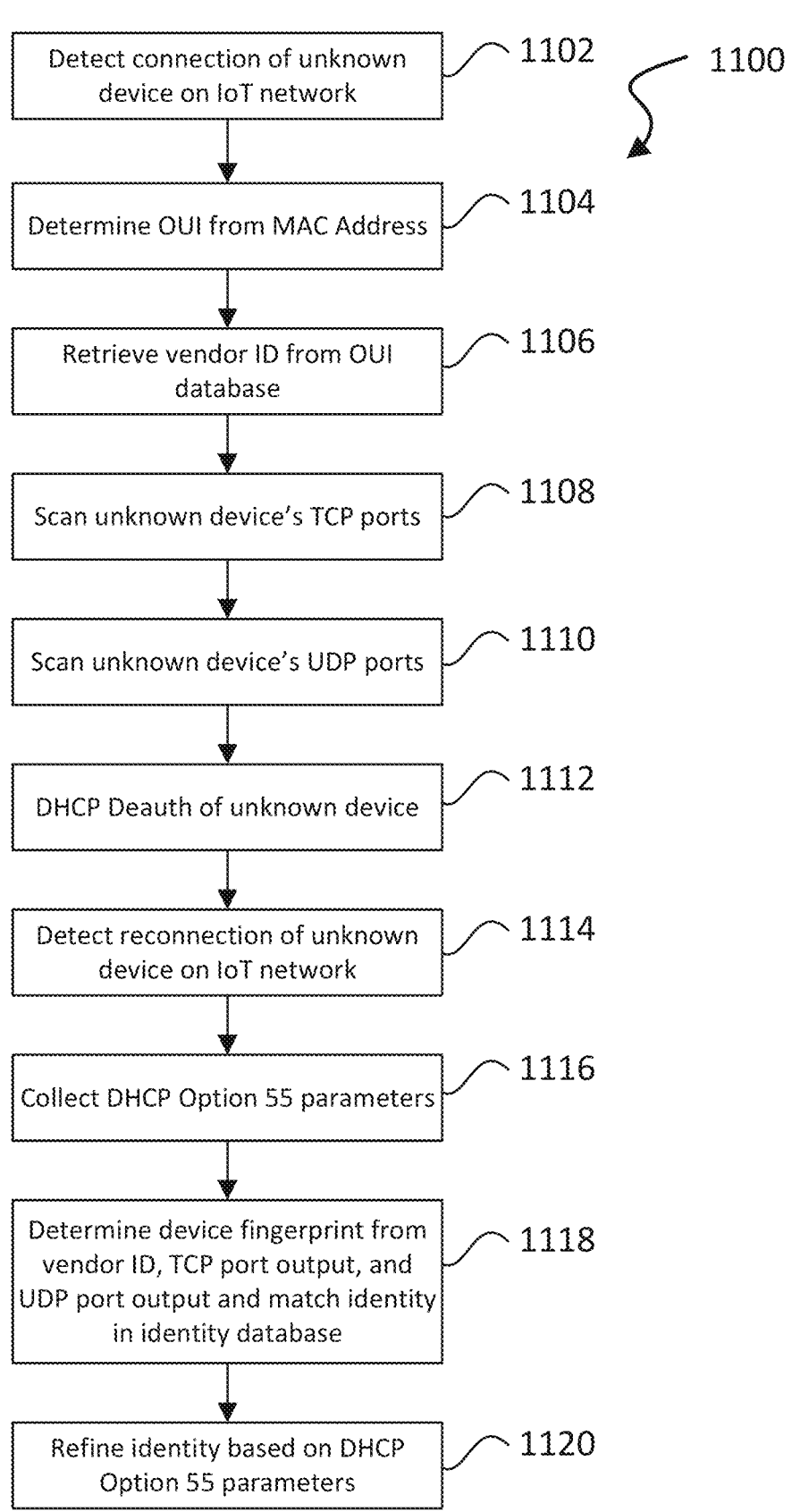
FIG. 11 is a flowchart of a method for determining the identity of a legacy or non-compliant IoT device on an IoT network, according to some embodiments.

FIG. 11 is a flowchart of a method 1100 for determining the identity of a legacy or non-compliant (or otherwise unknown) IoT device on an IoT network, according to some embodiments. In step 1102 of the method, an IoT system detects a connection of a legacy, non-compliant, or otherwise unknown device on the IoT network. In step 1104, the IoT system determines an organizational unique identifier (OUI) from a media access control (MAC) address of the unknown device. The MAC address is stored in a datafile for the IoT device. In step 1106, the IoT system retrieves a vendor identifier (ID) from an OUI database corresponding to the OUI. In step 1108, the IoT system scans the unknown device's TCP ports. Specifically, the IoT system sends a plurality of requests to the unknown device, where each request is sent to one of a plurality of TCP ports of the unknown device. In response, the IoT system receives a TCP port output comprising a corresponding response to each request made to a corresponding one of the plurality of TCP ports. The TCP port data is stored in the IoT device datafile.

In step 1110 of method 1100, the IoT system scans the unknown device's UDP ports. Specifically, the IoT system sends a plurality of UDP datagrams to the unknown device, where each datagram is sent to one of a plurality of UDP ports of the unknown device. In response, the IoT system receives a UDP port output comprising a corresponding response to each datagram sent to a corresponding one of the plurality of UDP ports. The UDP port data is also stored in the IoT device datafile. In step 1112, the IoT system sends a dynamic host configuration protocol (DHCP) deauthorization request to the unknown device. In step 1114, the IoT system detects reconnection of the unknown device on the IoT network. In step 1116, the IoT system proceeds to collect DHCP option 55 parameters from the unknown device and stores the parameters in the IoT device datafile.

In step 1118, defined as active device fingerprinting, the IoT system determines a combined device fingerprint from the vendor ID, the TCP port output, and the UDP port output in the IoT device's datafile. This data is then matched to the data in the centralized fingerprints database (i.e., an identity database) 720, as further illustrated in FIG. 10, to determine whether the combined device fingerprint is known. If a match is found, the IoT system determines a first identity of the unknown device based on matching the combined device fingerprint to parameters in the identity database. In step 1120, defined as passive device fingerprinting, the identity of the IoT device can be refined based on the DHCP option 55 parameters collected in step 1116. In this case, the IoT system may determine a second (or refined) identity based on the DHCP option 55 parameters. The IoT device becomes known from both or one of the active fingerprinting and the passive fingerprinting.

By applying method 1100, after comparing a MUD file for the known IoT device with the combined fingerprint and subsequent behavior profile for the unknown IoT device, as illustrated in FIG. 6, defense-in-depth can be effectively applied.

Using the identity comparison process described herein, behaviors that are consistent with malicious attacks can more easily be identified and rejected by an IDS that performs method 1100. From each identity database (IoT device-specific data and centralized fingerprints data), the vendor information, TCP port data, and UDP port data can be compared. After an IoT device's behavior is specified, that specification can then be used to provide a real and accurate structure that can be used to categorize network behavior. This network behavior can be used in the IDS by comparing the access control structure with the actual network usage of the IoT device. This "usage description" provides an accurate and real structure that can be used to categorize network behavior of identified devices in an IDS by comparing the access control structure with the actual network usage of the device.

Additionally, or alternatively, a machine learning (ML) engine can be provided in the system to augment the IoT Fingerprinting Matrix processes. An ML algorithm can be used at the network's edge to increase the confidence of identifying a network-connected IoT device. The approach consists of capturing raw network data, then preparing the network data by extracting the data into a structured aggregate. This aggregate data is then extrapolated into prime features selected to characterize and identify IoT devices with the highest accuracy. The features can be a combination of simple extracted features (e.g., Source/Destination IP, Protocol) and statistical features (e.g., packet inter-arrival times, payload entropy) from packet data. The feature dataset can then be processed through an ensemble machine learning model that learns information collected from the IoT device. This information can then be combined with other identification metrics to present the identity with the highest confidence.

Using ML to analyze packet data in combination with the fingerprinting methods described herein can increase the confidence of classifying or affirming the identity of an IoT device. The robustness of machine learned packet analysis can protect against spoofing attacks by determining and extracting the most important features for IoT device identification. The behavior profile of ML can add to the confidence of the IoT device identification by further attesting that an identified IoT device is of a specific classification determined by the ML, making the machine learned identification more difficult to spoof.

Figure 12:
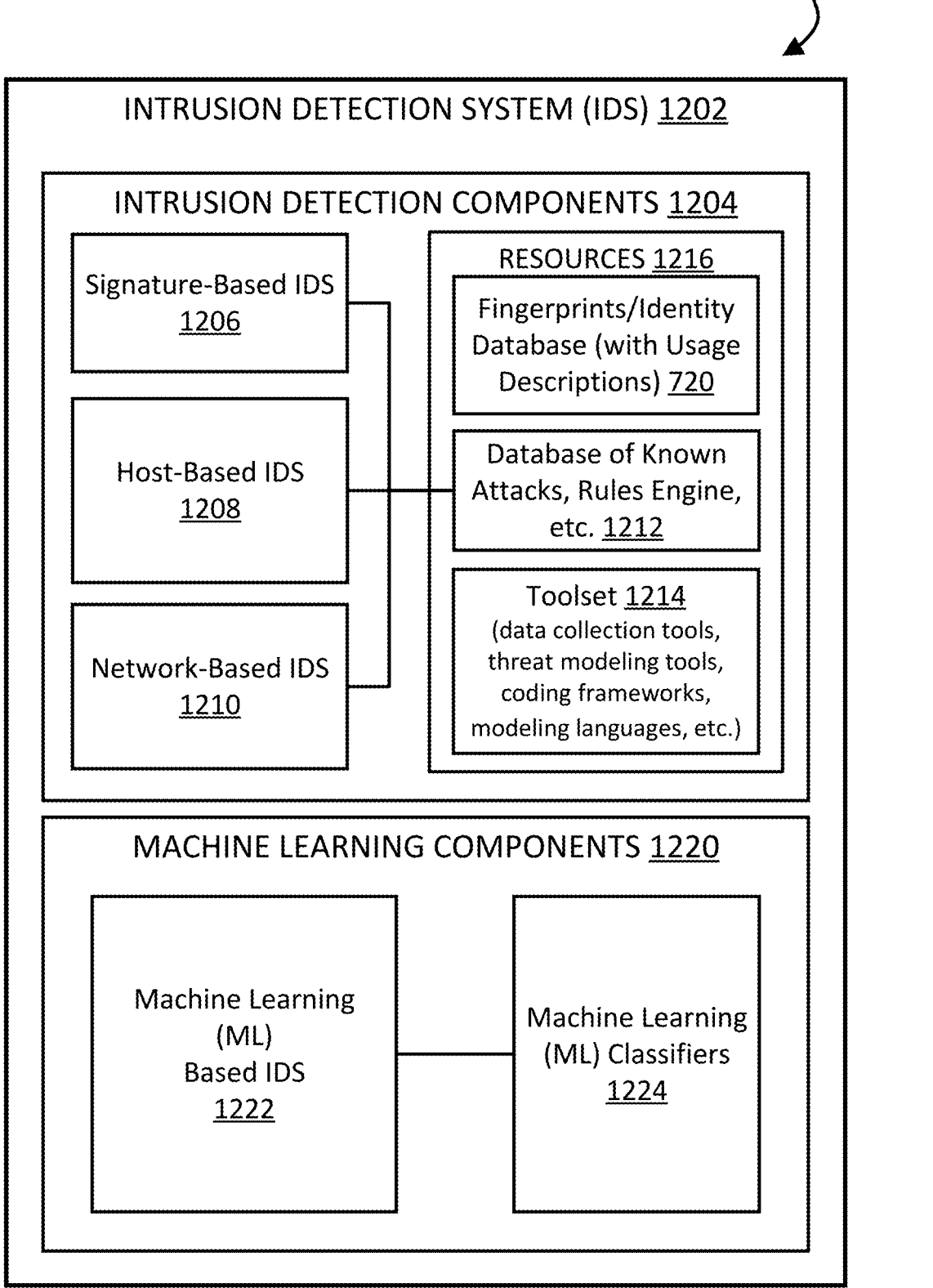
FIG. 12 illustrates an Intrusion Detection System for performing the method of FIG. 11, according to some embodiments.

FIG. 12 illustrates a diagram 1200 of an example Intrusion Detection System (IDS) 1202 for performing the method of FIG. 11, according to some embodiments. IDS 1202 can utilize certain traditional intrusion detection components 1204 complemented by advanced machine learning components 1220 including a machine learning (ML)-based IDS 1222 implementing ML classifiers 1224, according to some embodiments. A typical IDS may use several different techniques to detect and prevent malicious network activity for defense-in-depth, including techniques for intrusion detection, intrusion prevention, dynamic access control, and device authentication, for example.

Traditional intrusion detection components 1204 of an IDS 1202 for detecting malicious attacks may include signature-based IDS 1206, host-based IDS 1208, and network-based IDS 1210 components. Each of these traditional components can utilize resources 1216 including a database of known attacks, rules engine, etc. 1212, which can be available to the system for comparison to and analysis of IoT system data (e.g., network traffic, such as requests, responses, and handshakes). For example, a signature-based IDS 1206 can identify data having unique patterns or identifiers in network traffic that indicate malicious activity or unauthorized access, compare the data to known signatures in a database, and generate an alert when a match is found. Signature-based detection is common to antivirus tools, for example. Signature-based IDS solutions can be limited in that they are traditionally unable to detect patterns or indicators of new threats that are not already known. However, by including the aspects of dynamic fingerprinting and device behavior characterization as disclosed herein, unknown devices can be known, and their identity (by way of fingerprints) and usage descriptions can be available to a signature-based IDS via a centralized fingerprints/identity database 720.

As another example of traditional intrusion detection components 1204 of an IDS, host-based IDS 1208 solutions operate on individual host systems, such as a server, a PC, or any other type of device that produces logs, metrics, and other data that can be monitored for security purposes. In comparison, a network-based IDS 1210 solution monitors for suspicious activity from the perspective of the network, by analyzing network data sources such as network switch logs for data indicating threat patterns or indicators. While a host-based IDS 1208 similarly monitors network activity, it does so from the perspective of individual hosts, not centralized networking equipment like switches. Additionally, a host-based IDS 1208 may use additional data sources over network data and thus can be more effective for various types of attack detection. However, like signature-based IDS solutions, both host-based IDS 1208 and network-based IDS 1210 solutions would traditionally be limited to detection of known types of attacks and would use established and static detection rules from such database of known attacks, rules engine, etc. 1212. Again, by including the aspects of dynamic fingerprinting and device behavior characterization as disclosed herein, unknown devices can become known, and their identity (by way of fingerprints) and usage descriptions can be available to both host and network-based IDSs via a centralized fingerprints/identity database 720.

Intrusion detection components 1204 of IDS 1202 may utilize additional resources 1216 such as tools and frameworks from Toolset 1214 for data collection, threat modeling, coding, and analysis (e.g., CAPEC analysis, STRIDE threat modeling, code frameworks such as the Pythonic framework, threat modeling tools such as the Microsoft Threat Modeling Tool, UML tools such as PlantUML, etc.), to varying degrees. Examples of such tool usage are further described in U.S. Non-Provisional application Ser. No. 18/600,391 titled "Ensemble Intrusion Detection System for IoT Platforms," which is herein incorporated by reference in its entirety.

Preferably, machine learning components 1220 can be used in conjunction with intrusion detection components 1204 to provide additional context into actual network behavior that can be dynamically configured as new types of attacks arise. To that end, a machine learning (ML)-Based IDS 1222 can capture data from an IoT system (including various commercial IoT devices), extract meaningful patterns that indicate possible suspicious activity from the captured dataset, and establish new and ever-changing rules for detecting and classifying new attacks. ML-Based IDS 1222 can limit the threat surfaces between the IoT cloud platform and edge devices in an automated way. By contrast, viewing normal data traffic from IoT devices is a non-automated process for traditional IDSs.

Further, ML-Based IDS 1222 can apply established ML techniques such as logistic regression, decision tree, random forest, gradient boosting, and K-neighbor classification, as well as algorithms for automatically pruning the data, automatically selecting the most effective ML algorithm(s) for accurately and dynamically identifying possible attacks at a present time, and automatically determining a set of ML classifiers 1224 to apply to present and new IoT system data for real-time attack detection. Thus, ML-Based IDS 1222, utilizing ML classifiers 1224, is not limited to detection of known types of attacks as would only be possible for traditional intrusion detection components 1204 when applying detection rules and pattern data from database of known attacks, rules engine, etc. 1212. Thus, the combination of the use of centralized fingerprints/identity database 720 along with such ML techniques can be effective for characterizing and identifying IoT devices with high accuracy and confidence and a low level of granularity so that the appropriate security methods can be chosen and applied for defense-in-depth. Further description of IDS 1202 with an example ML-based IDS 1222 can be found in U.S. Non-Provisional application Ser. No. 18/600,391 titled "Ensemble Intrusion Detection System for IoT Platforms," which is herein incorporated by reference in its entirety.

Exemplary Computer System

Figure 13:
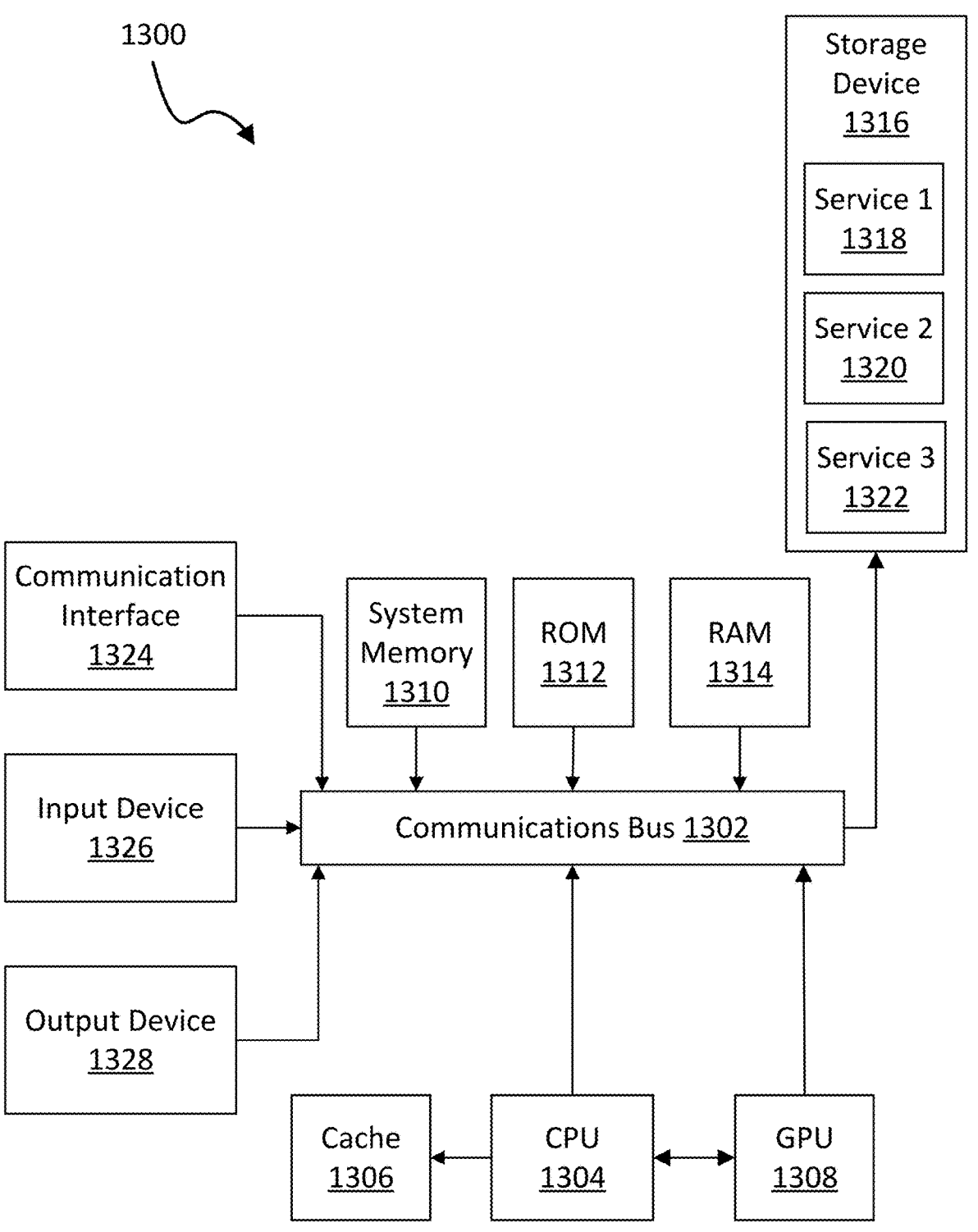
FIG. 13 illustrates an exemplary computer system suitable for implementing the methods and systems described herein.

FIG. 13 illustrates an exemplary computer system 1300 suitable for implementing the methods and systems described herein. IDS 1202 and aspects implementing the physical security techniques described herein may take the form of computer system 1300, although variations thereof may readily be implemented by persons skilled in the art as may be desirable for any particular installation. In each such case, one or more computer systems 1300 may carry out the foregoing methods as computer code.

Computer system 1300 includes a communications bus 1302, or other communications infrastructure, which communicates data to other elements of computer system 1300. For example, communications bus 1302 may communicate data (e.g., text, graphics, video, other data) between communications bus 1302 and an I/O interface to input device 1326 and output device 1328, which may include a display, a data entry device such as a keyboard, touch screen, mouse, or the like, and any other peripheral devices capable of entering and/or viewing data as may be apparent to those skilled in the art.

Further, computer system 1300 includes at least one processor, which may include central processing unit (CPU) 1304 and general processing unit (GPU) 1308, and which may comprise a special purpose or a general purpose digital signal processor. CPU 1304 may communicate with cache 1306 for temporary processing memory. CPU 1304 can include one or more hardware or software service(s), such as services 1318, 1320, 1322 stored in storage device 1316, configured to control the one or more processors of CPU 1304. A software service can perform one or more functions when the one or more processors execute(s) the software associated with the service. In some embodiments, a service is a program or a collection of programs that carry out a specific function. In some embodiments, a service can be considered a server. CPU 1304 can alternatively, or additionally, include a special-purpose processor having software instructions incorporated into the processor design.

Still further, computer system 1300 includes a system memory 1310, which may include or interface with random access memory ("RAM") 1314, read-only memory ("ROM") 1312, one or more mass storage devices, or any combination of tangible, non-transitory memory, for example. Still further, computer system 1300 may include a secondary memory, which may comprise a hard disk, a removable data storage unit, or any combination of tangible, non-transitory memory. For example, computer system 1300 may include storage device 1316.

Finally, computer system 1300 may include a communication interface 1324, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of system memory 1310, ROM 1312, RAM 1314, storage device 1316, communication interface 1324, and combinations of the foregoing may function as a non-transitory computer usable storage medium or computer readable storage medium to store and/or access computer software including computer instructions. For example, computer programs or other instructions may be loaded into the computer system 1300 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory, or through communications bus 1302 to system memory 1310.

Communication interface 1324 allows software, instructions, and data to be transferred between the computer system 1300 and external devices or external networks. Software, instructions, and/or data transferred by the communication interface 1324 are typically in the form of signals that may be electronic, electromagnetic, optical, or other signals capable of being sent and received by communication interface 1324. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow one or more processors of computer system 1300 to implement the methods discussed herein for the detection and prevention of various cyber-attacks on BACnet devices in communication on a BACnet MS/TP network, according to computer software including instructions. Computer system 1300 may perform any one of, or any combination of, the steps of any of the methods described herein. It is also contemplated that the methods according to the present invention may be performed automatically or may be accomplished by some form of manual intervention.

The computer system 1300 is provided only for purposes of illustration, such that the invention is not limited to this specific embodiment. Persons having ordinary skill in the art are capable of programming and implementing the instant invention using any computer system.

Further, computer system 1300 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a handheld console, an MP3 player, or other similarly configured small-size, portable computing device as may occur to those skilled in the art.

An Intrusion Detection System may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement an Intrusion Detection System. A cloud data center may include one or more networks that are managed through a cloud management system. Each such network includes resource servers that permit access to a collection of computing resources and components of the Intrusion Detection System, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer usable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for identifying an unknown device on an Internet of Things (IoT) network, the method comprising:

detecting connection of an unknown device on the IoT network;

determining an organizational unique identifier (OUI) from a media access control (MAC) address of the unknown device;

determining a hostname from a DNS reverse lookup of the unknown device;

retrieving a vendor identifier (ID) from an OUI database corresponding to the OUI;

sending a plurality of requests to the unknown device including TCP SYN probes generated as raw IP packets and directed to a predefined set of TCP port numbers associated with IoT services, wherein each request is sent to one of a plurality of transmission control protocol (TCP) ports of the unknown device;

receiving a TCP port output comprising a corresponding response to each request made to a corresponding one of the plurality of TCP ports;

sending a plurality of user datagram protocol (UDP) datagrams to the unknown device including UDP datagrams with protocol-specific payloads to elicit service-specific responses from DNS, SNMP, and DHCP services, wherein each datagram is sent to one of a plurality of UDP ports of the unknown device;

receiving a UDP port output comprising a corresponding response to each datagram sent to a corresponding one of the plurality of UDP ports;

sending a dynamic host configuration protocol (DHCP) deauthorization request to the unknown device;

detecting reconnection of the unknown device on the IoT network;

collecting and filtering DHCP options and parameters (e.g., DHCP Hostname from Option 12) from the unknown device;

collecting and filtering DHCP option 55 parameters from the unknown device;

determining from the vendor ID, the TCP port output, and the UDP port output a device fingerprint, wherein the device fingerprint comprises a tuple including: (i) the vendor ID mapped from the OUI, (ii) a TCP port-state vector comprising open/closed/filtered states per probed port, and (iii) a UDP port-state vector comprising open/open|filtered/closed/filtered per probed port;

determining a first identity of the unknown device based on matching the device fingerprint to parameters in an identity database, wherein matching comprises comparing the tuple to entries in a structured, MUD-oriented identity database;

refining the first identity to determine a second identity based on the DHCP option 55 parameters, wherein refining the first identity comprises correlating values in the collected DHCP Option 55 parameters with manufacturer- and model-specific parameter request patterns stored in the identity database; and applying, by a network controller, a behavior-based access policy associated with the refined identity.

2. The method of claim 1, further comprising determining an access policy for the unknown device having the second identity.

3. The method of claim 2, further comprising determining a behavior profile from the access policy.

4. The method of claim 3, further comprising determining a plurality of behavior-based security policies from the behavior profile.

5. The method of claim 4, wherein the determining comprises correlating and selecting at least one of the plurality of behavior-based security policies based on the second identity and the behavior profile.

6. The method of claim 4, wherein the plurality of behavior-based security policies comprise one or more policies for intrusion detection, intrusion prevention, dynamic access control, or device authentication.

7. The method of claim 1, further comprising populating a datafile associated with the first identity with the vendor ID, the TCP port output, and the UDP port output to create a device fingerprint for the unknown device.

8. The method of claim 7, further comprising populating the datafile associated with the first identity with the DHCP Option 55 parameters to create a combined device fingerprint for the unknown device.

9. The method of claim 8, wherein a structure of the datafile is specified by a Manufacturer Usage Description (MUD) for the first identity or the second identity, wherein the MUD is defined by Request for Comments (RFC) 8520 and defines rules for establishing an access policy for a device of the first identity or the second identity.

10. The method of claim 3, further comprising creating a software-defined network to automate functions of the IoT network according to a Manufacturer Usage Description (MUD) selected based on the behavior profile.

11. The method of claim 1, further comprising extracting features of the identity database into a structured aggregate of prime features characterizing an identified IoT device and processing the structured aggregate of prime features through an ensemble machine learning (ML) model to train the ensemble ML model to accurately identify another IoT device having the prime features.

12. The method of claim 11, wherein the structured aggregate of prime features is selected based on a correlation with features associated with security techniques, and wherein the method further comprises processing the behavior profile and the first identity or the second identity through the ensemble ML model to select one or more individual security techniques for defense-in-depth for the identified IoT device.

13. A system for identifying an unknown device on an Internet of Things (IoT) network, the system comprising one or more processors and memory storing computer-executable instructions that, when executed by the one or more processors, causes the system to:

detect connection of an unknown device on the IoT network;

determine an organizational unique identifier (OUI) from a media access control (MAC) address of the unknown device;

determine a hostname from a DNS reverse lookup of the unknown device;

retrieve a vendor identifier (ID) from an OUI database corresponding to the OUI;

send a plurality of requests to the unknown device, wherein each request is sent to one of a plurality of transmission control protocol (TCP) ports of the unknown device, wherein sending the plurality of requests comprises generating TCP SYN probes as raw IP packets directed to a predefined set of TCP port numbers associated with IoT services, and monitoring for SYN-ACK and RST responses to populate a TCP port-state vector;

receive a TCP port output comprising a corresponding response to each request made to a corresponding one of the plurality of TCP ports;

send a plurality of user datagram protocol (UDP) datagrams to the unknown device, wherein each datagram is sent to one of a plurality of UDP ports of the unknown device, wherein sending the plurality of UDP datagrams comprises transmitting protocol-specific UDP payloads to elicit service-specific responses from DNS, SNMP, and DHCP services, and classifying responses and ICMP 'port unreachable' codes to populate a UDP port-state vector;

receive a UDP port output comprising a corresponding response to each datagram sent to a corresponding one of the plurality of UDP ports;

send a dynamic host configuration protocol (DHCP) deauthorization request to the unknown device;

detect reconnection of the unknown device on the IoT network;

collect and filter DHCP options and parameters (e.g., DHCP Hostname from Option 12) from the unknown device, including parsing a DHCP Option 55 Parameter Request List emitted during a DHCP discovery process;

collect and filter DHCP option 55 parameters from the unknown device;

determine from the vendor ID, the TCP port output, and the UDP port output a device fingerprint, wherein the device fingerprint comprises a tuple including: (i) the vendor ID mapped from the QUI, (ii) a TCP port-state vector comprising open/closed/filtered states per probed TCP port, and (iii) a UDP port-state vector comprising open/open|filtered/closed/filtered states per probed UDP port;

determine a first identity of the unknown device based on matching the device fingerprint to parameters in an identity database, wherein determining the first identity comprises comparing the device-fingerprint tuple to entries in a structured centralized fingerprints/identity database; and refine the first identity to determine a second identity based on the DHCP option 55 parameters, wherein refining the first identity comprises correlating values in the collected DHCP Option 55 parameters with manufacturer- and model-specific parameter-request patterns stored in the identity database.

14. The system of claim 13, further comprising computer-executable instructions that, when executed by the one or more processors, causes the system to determine an access policy for the unknown device having the second identity.

15. The system of claim 14, further comprising computer-executable instructions that, when executed by the one or more processors, causes the system to determine a behavior profile from the access policy.

16. The system of claim 15, further comprising computer-executable instructions that, when executed by the one or more processors, causes the system to determine a plurality of behavior-based security policies from the behavior profile.

17. The system of claim 16, wherein to determine the plurality of behavior-based security policies from the behavior profile, execution of the computer-executable instructions by the one or more processors causes the system to correlate and select at least one of the plurality of behavior-based security policies based on the second identity and the behavior profile.

18. The system of claim 16, wherein the plurality of behavior-based security policies comprise one or more policies for intrusion detection, intrusion prevention, dynamic access control, or device authentication.

19. The system of claim 13, further comprising computer-executable instructions that, when executed by the one or more processors, causes the system to populate a datafile associated with the first identity with the vendor ID, the TCP port output, and the UDP port output to create a device fingerprint for the unknown device.

20. The system of claim 19, further comprising computer-executable instructions that, when executed by the one or more processors, causes the system to populate the datafile associated with the first identity with the DHCP Option 55 parameters to create a combined device fingerprint for the unknown device.

21. The system of claim 20, wherein a structure of the datafile is specified by a Manufacturer Usage Description (MUD) for the first identity or the second identity, wherein the MUD is defined by Request for Comments (RFC) 8520 and defines rules for establishing an access policy for a device of the first identity or the second identity.

22. The system of claim 13, further comprising computer-executable instructions that, when executed by the one or more processors, causes the system to:

extract features of the identity database into a structured aggregate of prime features characterizing an identified IoT device; and process the structured aggregate of prime features through an ensemble machine learning (ML) model to train the ensemble ML model to accurately identify another IoT device having the prime features.

23. The system of claim 22, wherein the structured aggregate of prime features is selected based on a correlation with features associated with security techniques, and wherein the system further comprises computer-executable instructions that, when executed by the one or more processors, causes the system to process the behavior profile and the first identity or the second identity through the ensemble ML model to select one or more individual security techniques for defense-in-depth for the identified IoT device.

\* \* \* \* \*